United States Patent [19]
Anderson et al.

[11] Patent Number: 5,717,789
[45] Date of Patent: Feb. 10, 1998

[54] IMAGE ENHANCEMENT BY NON-LINEAR EXTRAPOLATION IN FREQUENCY SPACE

[75] Inventors: Charles H. Anderson, Ladue, Mo.; Hayit K. Greenspan, Pasadena, Calif.

[73] Assignee: California Institute of Technology, Pasadena, Calif.

[21] Appl. No.: 525,319

[22] Filed: Sep. 7, 1995

Related U.S. Application Data

[63] Continuation of Ser. No. 118,943, Sep. 8, 1993, abandoned.

[51] Int. Cl.$^6$ .................................................. G06K 9/40
[52] U.S. Cl. ........................... 382/254; 382/191; 382/260; 382/263
[58] Field of Search ................................. 382/191, 240, 382/253, 254, 255, 258, 260–266, 275, 303; 348/623

[56] References Cited

U.S. PATENT DOCUMENTS

| | | | |
|---|---|---|---|
| 4,399,461 | 8/1983 | Powell | 382/54 |
| 4,523,230 | 6/1985 | Carlson et al. | 348/623 |
| 4,661,986 | 4/1987 | Anderson et al. | 382/255 |
| 4,674,125 | 6/1987 | Carlson et al. | 382/41 |
| 4,698,843 | 10/1987 | Burt et al. | 382/258 |
| 4,709,394 | 11/1987 | Bessler et al. | 382/41 |
| 4,718,104 | 1/1988 | Anderson | 382/41 |
| 4,736,448 | 4/1988 | Umemura | 382/54 |
| 4,797,942 | 1/1989 | Burt | 382/260 |
| 4,987,480 | 1/1991 | Lippman et al. | 382/253 |
| 5,029,227 | 7/1991 | Kawamura | 382/22 |
| 5,231,677 | 7/1993 | Mita et al. | 382/22 |
| 5,526,446 | 6/1996 | Adelson et al. | 382/260 |

OTHER PUBLICATIONS

"Digital Image Processing", Rafael C. Gonzales, Richard E. Woods, Addison Wesley, 1992 pp. 195–201, 416–495.

"A New Class of Nonlinear Filters for Image Enhancement", 1991 IEEE, Sanjit K. Mitra, Hui Li, Ing-song Lin, Tian-hu Yu, Signal and Image Processing Laboratory, Department of Electrical and Computer Engineering, University of California, Santa Barbara, California 93106, pp. 2525–2528.

Mason et al., *Electronic, Circuits, Signals and Systems*, John Wiley & Sons Inc. pp. 503–505, 1960. Book in Group 2300 Library.

*Primary Examiner*—Jose L. Couso
*Attorney, Agent, or Firm*—Blakely, Sokoloff, Taylor & Zafman LLP

[57] ABSTRACT

An input image is enhanced to include spatial frequency components having frequencies higher than those in an input image. To this end, an edge map is generated from the input image using a high band pass filtering technique. An enhancing map is subsequently generated from the edge map, with the enhanced map having spatial frequencies exceeding an initial maximum spatial frequency of the input image. The enhanced map is generated by applying a non-linear operator to the edge map in a manner which preserves the phase transitions of the edges of the input image. The enhanced map is added to the input image to achieve a resulting image having spatial frequencies greater than those in the input image. Simplicity of computations and ease of implementation allow for image sharpening after enlargement and for real-time applications such as videophones, advanced definition television, zooming, and restoration of old motion pictures.

8 Claims, 13 Drawing Sheets

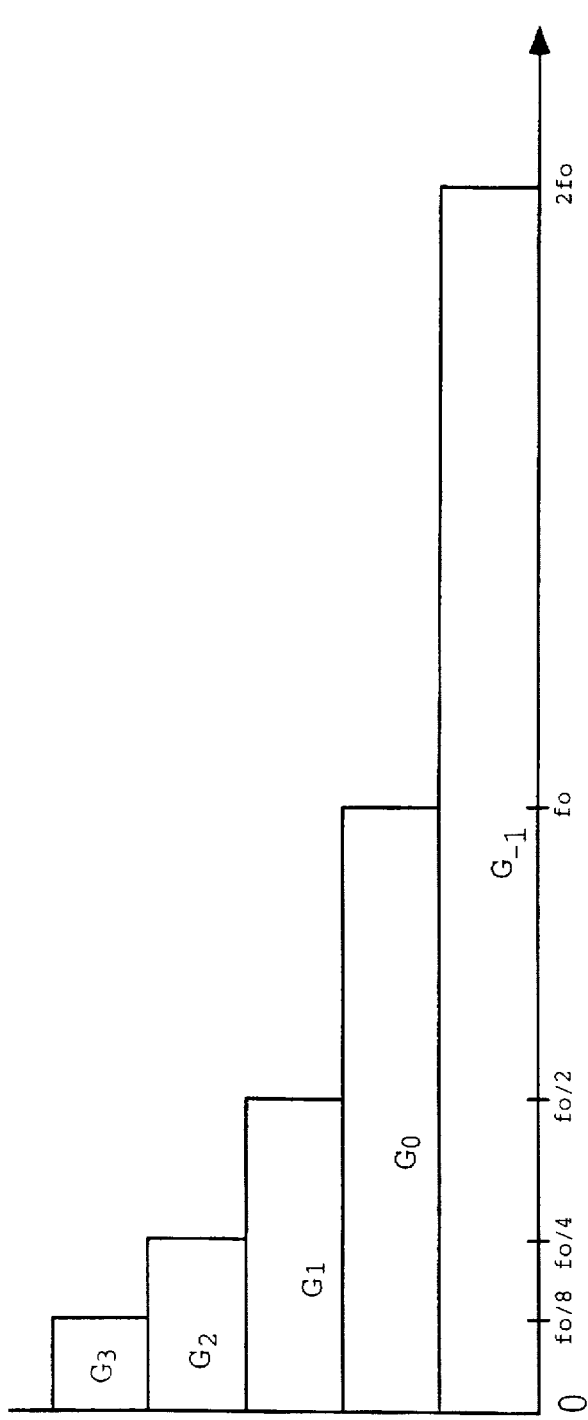
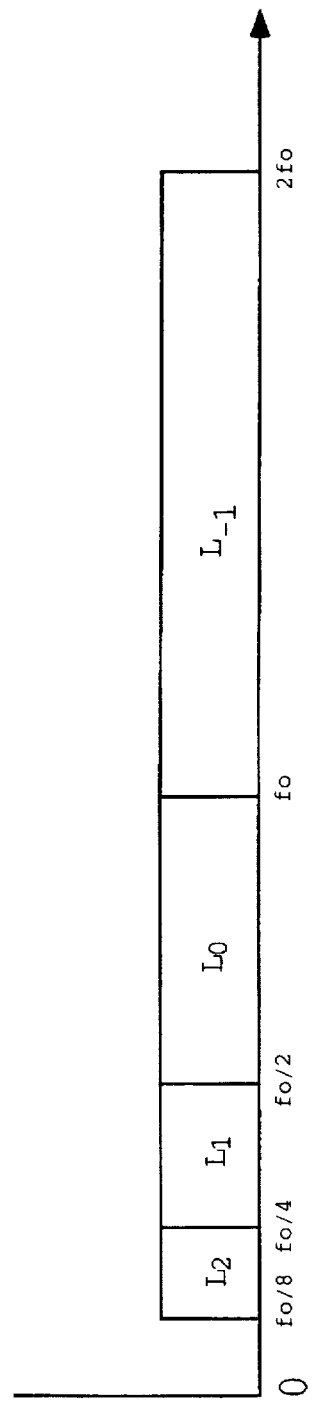

IMAGE ENHANCEMENT BY NON-LINEAR EXTRAPOLATION IN FREQUENCY SPACE

This is a continuation of application Ser. No. 08/118,943 filed Sep. 8, 1993 now abandoned.

ORIGIN OF THE INVENTION

The invention described herein was made in the performance of work under a NASA contract, and is subject to the provisions of Public Law 96-517 (35 USC §202) in which the Contractor has elected to retain title.

BACKGROUND OF THE INVENTION

1. Field of the Invention

The invention relates to signal processing techniques, and more specifically to techniques for the enhancement of edges in a temporal signal containing information in one or more dimensions. The edge enhancing techniques taught herein are advantageously applied to television, and other, related applications.

2. General Description of Related Art

A wide variety of techniques have been developed for processing and filtering signals, particularly signals representing two-dimensional images. In particular, many image processing techniques are provided for enhancing the clarity of a blurred image. An image may appear blurred for a number of reasons. An original sharp image may be blurred during transmission due to noise or other factors. In other circumstances, the original image is itself insufficiently clear and techniques are employed to sharpen the original image. Even in circumstances where an image is not actually blurred, the image may appear blurred due to human visual perception considerations.

If an image is blurred or degraded by a well-understood process, such as shot noise occurring during transmission, the image can usually be enhanced by developing a model of the source of degradation, then reconstructing the original image using the model. However, in many circumstances, a source of degradation of the image cannot be modeled and, hence, the image cannot be faithfully reconstructed.

In many circumstances, a blurred or perceptually blurry image may be enhanced, by enhancing high frequency spatial components of the image. For example, high frequency components are usually degraded more significantly during transmission than low frequency components. Hence, enhancement of high frequency components may be effective in compensating for high frequency components lost during transmission. Moreover, as will be described in more detail below, because of human visual perception considerations, an image having enhanced high frequency components simply appears sharper than an image without enhanced high frequency components.

Accordingly, various image processing techniques have been developed for modifying or supplementing the high spatial frequency components of an image, either for the purpose of providing a perceptually clearer image or for compensating for degradation in an image caused during transmission.

In the following, several such image processing techniques are summarized and general visual perceptual considerations are described. Although the following discussion is primarily directed to two dimensional time-varying or "temporal" signals, the techniques are, unless otherwise noted, generally applicable to n-dimensional information components defined by applied temporal signals that have been sampled and converted to sample streams with level-values which define the information. For optical image processing n equals two, and the information component is a visual image.

Perception Considerations

It has been found that the human visual system appears to compute a primitive spatial-frequency decomposition of luminous images, by partitioning spatial frequency information into a number of contiguous, overlapping spatial-frequency bands. Each band is roughly an octave wide and the center frequency of each band differs from its neighbors by roughly a factor of two. Research suggests that there are approximately seven bands of "channels" that span the 0.5 to 60 cycle/degree spatial-frequency range of the human visual system. The importance of these findings is that spatial frequency information more than a factor of two away from other spatial frequency information will be independently processed by the human visual system.

An important parameter of a signal processing scheme is the highest spatial frequency of interest $f_0$. In general, the selection of $f_0$ is based on the desired application. When the temporal signal has two dimensions and the signal defines a visual image, selection of $f_0$ is based on human visual perception considerations. Thus, if the highest spatial frequency of interest of the image is not greater than $f_0$, the highest frequency band will cover the octave from $f_0/2$ to $f_0$ (having a center frequency at $3f_0/4$); the next-to-highest frequency band will cover the octave from $f_0/4$ to $f_0/2$ (having a center frequency at $3f_0/8$), and so on.

It has been further found that the spatial-frequency processing that occurs in the human visual system is localized in space. Thus, the signals within each spatial-frequency channel are computed over small sub-regions of the image. These sub-regions overlap each other and are roughly two cycles wide at a particular frequency.

If a sine wave grating image is employed as a test pattern, it is found that the threshold contrast-sensitivity function for the sine wave grating image rolls-off rapidly as the spatial frequency of the sine wave grating image is increased. That is, high spatial frequencies require high contrast to be seen (≈20% at 30 cycle/degree) but lower spatial frequencies require relatively low contrast to be seen (≈0.2% at 3 cycle/degree).

It has been found that the ability of the human visual system to detect a change in the contrast of a sine wave grating image that is above threshold also is better at lower spatial frequencies than at higher spatial frequencies. Specifically, an average human subject, in order to correctly discriminate a changing contrast 75% of the time, requires roughly a 12% change in contrast for a 3 cycle/degree sine wave grating, but requires a 30% change in contrast for a 30 cycle/degree grating.

The perceived inherent sharpness of an image depends on the ratio of the maximum present spatial frequency of interest $f_0$ to the solid angle of view subtended by the image with respect to the human eye. This solid angle equals approximately the area of the image divided by the viewer's distance from the image.

When an image is expanded (or enlarged) e.g. by a linear factor of two, its two-dimensional area is expanded by a factor of four. Expansion is accomplished by inserting additional pixels (or samples) in the picture. Typically the newly inserted samples are assigned level-values that are calculated to be the averages of the level-values of their neighboring samples, and the spatial frequencies are accordingly halved. Therefore, the ratio of the maximum frequency of interest $f_O$ to the viewing angle is accordingly degraded, unless the viewer "steps back", i.e. increases the distance from the image by the same linear factor that the image was expanded by. This would decrease the solid angle and restore the perceived inherent sharpness of the image. Consequently, an image resulting from an expansion without more processing appears to a stationary viewer as having less inherent sharpness than the original, i.e., the image appears blurred. Stated otherwise, enlargement without more processing leads to an image lacking concomitant information in the higher spatial frequency bands.

The Burr Pyramid Algorithm for Spatial Frequency Analysis

One example of a technique for enhancing images is the Burr Pyramid Algorithm (developed by Peter J. Burt). The Burt Pyramid Algorithm permits an original high-resolution image to be synthesized from component sub-spectra images without the introduction of spurious spatial frequencies due to aliasing. The Burt Pyramid Algorithm is particularly well-suited for both analyzing a spatial frequency spectrum of images and for synthesizing an image from its analyzed sub-spectra.

The term "pyramid" as used herein, generally relates to the successive reduction in the spatial frequency bandwidth and sample density of each of the hierarchy of component images in going from the highest octave component image to the lowest octave component image.

One example of a technique for enhancing images is the Burt Pyramid algorithm. The Burt Pyramid Algorithm uses particular sampling techniques for analyzing a relatively high resolution original image into a hierarchy of N (where N is a plural integer) separate component images (in which each component image is a Laplacian image comprised of a different octave of the spatial frequencies of the original image) plus a remnant Gaussian image (which is comprised of all the spatial frequencies of the original image below the lowest octave component Laplacian image).

In the following the input image is referred to as $G_O$, the LPF versions are labeled $G_1$ through $G_N$ with decreasing resolutions and the corresponding edge maps are labeled $L_0$ through $L_N$ respectively.

A stage of Burr Pyramid analysis is shown in FIG. 1. An input image (denoted as $G_O$) is input, then convolved and decimated using a convolution filter 102, to produce a filtered decimated image $G_1$. Sub-sampling is also generally referred to as "decimating".

The convolution filter 102 is a low pass filter that exhibits spatially localized, gradual roll-off characteristics, rather than "brick wall" roll-off characteristics. More specifically, each of the low pass filters employed by a Burr Pyramid analyzer meets each of the following two constraints. First, each of these filters employs a localized, symmetric kernel weighting function composed of at least three multiplier coefficients. Second, the multiplier coefficients of the kernel weighting function provide equal contribution; that is, all nodes at a given level contribute the same total weight to nodes at the next higher level. In the case of a three-tap filter, this means that the respective values of the three weighting multiplier coefficients of the kernel function of the filter in each dimension are respectively 0.25, 0.5, and 0.25. In the case of a five-tap filter, the values of the five weighting multiplier coefficients of the kernel function of the filter in each dimension are respectively (0.25-p/2), 0.25, p, 0.25, and (0.25-p/2), where p has a positive value.

The input image $G_O$ is delayed by a delay element 104. The filtered decimated image $G_1$ is re-expanded and interpolated by an expansion and interpolation filter 108. The expanded and interpolated $G_1$ is subtracted from the delayed $G_O$ by a subtraction element 106 to produce $L_O$, the first order edge map, also known as Laplacian. It is noteworthy that there are many ways a Laplacian can be computed. The term "Laplacian" does not inherently signify a particular method of derivation.

The filtered decimated image $G_1$ is subsequently input to a second stage, that is similar to the first, to produce $G_2$ and $L_1$, etc. Iteration continues until a desired number of pyramid levels is achieved.

The Burr Pyramid algorithm may further employ a synthesis component, that works in reverse to reconstruct the original image $G_O$ from the remnant sampled signal $G_N$ and the Laplacian sub-spectra sampled signals $L_0, \ldots, L_{N-1}$.

The reconstruction process involves adding to a given LPF (the remnant) version of the image, $G_N$, the band pass images, $L_j$ (j=N-1, \ldots, 0), thus reconstructing the Gaussian pyramid, level by level, up to the original input image, $G_O$. This is a recursive process as in equation (1):

$$G_j=L_j+G_{j+1}; \ j=N-1, \tag{1}$$

where $G_{j+1}$ is expanded, via interpolation, to the $G_j$ image size prior to the addition process.

Typically, the Burr Pyramid algorithm is implemented by computer in non-real time. Non-real time implementation of the Burr Pyramid algorithm by computer processing is particularly effective in processing fixed image information, such as a photograph. However, it is not particularly effective when applied to a stream of successively-occurring images continually changing in time (e.g., successive video frames of a television picture), unless special computation means are used, such as special purpose integrated circuits.

The Filter-Subtract-Decimate Algorithm for Spatial Frequency Analysis

An alternative to the Burt Algorithm was achieved by a Filter-Subtract-Decimate (FSD) Hierarchical Pyramid described in U.S. Pat. No. 4,718,104.

A stage of the FSD pyramid analysis component is shown in FIG. 2. As can be seen from FIG. 2, the FSD technique includes similar functional components to that of the Burr Pyramid algorithm of FIG. 1. In particular, an input image $G_O$ is filtered by a convolution filter 202. The input image $G_O$ is also delayed by a delay element 204, and the output image from convolution filter 202 is subtracted from a delayed version of input image $G_O$ by subtraction element 206 to produce an edge map $L_O$.

For an input signal comprising a sample stream of certain samples carrying information, the FSD analyzing technique involves convolving the image at every sample location with a symmetrical, localized, equal-contribution, low pass filter, n-dimensional kernel function having a low-pass transmission characteristic to derive a convolved sample stream. The convolved sample stream includes filtered samples that individually correspond to each of some of the certain samples of the input stream. The level-value of each of the filtered samples is subtracted from the level-value of that individual certain sample with which it corresponds, to derive an edge map $L_O$. Edge map $L_O$ comprises a first output sample stream that includes information-component samples corresponding to the input certain samples that define the band pass sub-spectrum with the particular relatively high sample density.

Unlike the Burt algorithm, convolution filter 202 of the FSD technique does not include a decimation element. Rather, a separate decimation element 205 is provided for receiving the output from convolution filter 202. Decimation element 205 operates to produce $G_1$. Hence, decimation of the convolved image need not be performed prior to the subtraction for the delayed input image. As a result, re-expansion and interpolation before subtraction are not necessary, as required in Burt Pyramid algorithm, to construct the edge map. Therefore, the separation of the decimation element from the convolution element represents a principal improvement in diminishing the required processing time of the FSD technique of the Burt Pyramid algorithm.

In all stages of the FSD algorithm, the convolved sample stream is decimated to derive a second output sample stream that includes information-component samples corresponding to only a given sub-multiple of the certain samples that define the remnant sub-spectrum with a relatively lower sample density in each dimension than the particular relatively high sample density.

Operation of the FSD algorithm as illustrated in FIG. 2 results in the generation of a Laplacian pyramid. The Laplacian pyramid consists of band pass filtered (BPF) versions of the input image, with each stage of the pyramid constructed by the subtraction of two corresponding adjacent levels of the Gaussian pyramid. The Laplacian pyramid can also be viewed as a difference-of-Gaussians (DOG) pyramid, where the DOG kernel, which is a good approximation to the Laplacian operator, is convolved with the input at every sample location to produce corresponding edge maps.

It has been shown that the Laplacian pyramid forms a complete representation of the image for spatial frequencies ranging from 0 to a preselected maximum frequency of interest $f_0$. Therefore, with the pyramid representation, complete reconstruction of the original image is enabled, for spatial frequencies up to $f_0$.

In general, pyramidal filtering schemes, such as the Burt Pyramid algorithm and the FSD algorithm, exploit some of the perceptual considerations noted above to provide reasonably effective filtering for certain applications, particularly non-real time applications. However, pyramid algorithms, such as those described above, typically require a large amount of computations which limit the effectiveness for real-time applications, particularly those wherein a visual image changes with time, such as a television image. Some of these limitations are presently overcome by a pyramid chip available from David Sarnoff Laboratories.

Image Sharpening by Enhancing Existing High Frequencies

The prior art concentrates mostly on enhancing existing high spatial frequencies of a given input image. However, the addition of high frequencies to such images requires increased data handling for processing. Different enhancement schemes will result in images that are formally different from the original.

Enhancing existing high frequencies is performed by convolving the input image with masks, the masks having a basic high pass filter characteristic, or derivative function filter characteristic. Such a technique is high boost filtering, as described in *Digital Image Processing* by Rafael C. Gonzalez and Richard E. Woods, 1992, pp. 195-201, by Addison Wesley.

"Unsharp masking" (or high frequency emphasis method) is another general technique of sharpening an image by enhancing its existing high frequencies. Unsharp masking is implemented by creating a low pass filtered version of the input image and then subtracting it from the input image to create a high pass filtered version of the image. A fraction of this high pass filtered version is subsequently added to the image. Even though this approach yields reasonably good results in many cases, some undesired noise is generated in the dark regions of images, and often the enhanced images are not visually pleasing.

Subsequent techniques replace the high pass filter step with a non-linear filter, and repeat the technique of adding a version of the image to the original image. Examples of such techniques are suggested by Mitra, as explained in the next section.

Mitra Image Enhancement Techniques

An image enhancement scheme proposed by Mitra et al. (S. K. Mitra, H. Li, I. Lin and T. Yu, "A New Class of Nonlinear Filters for Image Enhancement," *ICASSP 91*, M5.1, pp. 2525-2528, 1991) can be seen in FIG. 3a. A filtered version of the input image is calculated and added back to the input image.

Filtering is performed in three stages. First, an adjustable DC bias and the input image are input in the input ports of adder 310. The output of the adder is connected to the input of the second nonlinear filtering stage 340.

The second nonlinear filtering stage 340 produces a result that is biased either in the vertical and horizontal directions, or along the diagonal directions-with the latter chosen as giving better performance. The output of the nonlinear filtering stage 340 is connected to the input of the third filtering stage 350.

The third filtering stage 350 adds a non-linearity via a multiplication of the highpass filter by the local mean. The third filtering stage 350 formally produces a mapping. The mapping function can be seen in FIG. 3b. Horizontal axis 352 signifies the level-value of the input pixel, and vertical axis 358 signifies the level-value of the respective output pixel. The mapping line 354 suggests what level-values of output pixels are returned for what level-values of input pixels.

The mapping line 354 has the effect of adding less of the high-frequency components to the dark regions and more to the brighter ones, and can be desirable for a smoother perception of the enhanced result.

The procedure thus outlined has the undesirable effect of shifting the phase (i.e., the Zero Crossing (ZC) of the second derivative) towards the brighter region, thereby causing edges to appear slightly shifted, resulting in reduced fidelity to the input image. Further, aliasing in the output image is introduced.

Related Art Summary

The foregoing summarized a number of prior art image processing techniques particularly adapted for enhancing or sharpening two dimensional visual images. Although the various techniques have proven to be reasonably effective for certain applications, there is room for improvement, particularly in the fidelity of the enhanced output images with respect to time varying input images. In particular, conventional pyramid filtering techniques such as the Burt pyramid algorithm and the FSD algorithm are too computationally intensive to be effective for real time applications, unless custom made pyramid chips are used. Furthermore, the conventional pyramid techniques do not allow for the addition of spatial frequencies higher than those contained in the image being processed. As such, the conventional pyramid techniques do not fully exploit certain visual perceptual considerations, such as the perception that an image with higher spatial frequencies is a more faithful representation of a true image, regardless of the actual fidelity of the image.

The Mitra technique is somewhat more effective for sharpening an image but does not provide a resulting image with fidelity to the edges of the input image, and introduces aliasing.

As can be appreciated, it would be desirable to provide an improved image filtering technique, which can be applied to sharpen images with fidelity to the edges and no aliasing, and ideally also in real time to sharpen time varying images.

Further, since image expansion results in blurring, it would be desirable to provide an improved image filtering technique to sharpen expanded images.

SUMMARY OF THE INVENTION

It is an object of the present invention to provide an improved method for edge enhancement of input images.

It is yet another object of the present invention to provide a method for edge enhancement of input images that is computationally faster, introduces less aliasing, and has more fidelity to the input image than those described in the prior art.

It is a further object of the invention to provide a method for edge enhancement which exploits human visual conceptual considerations to provide a perceptually sharper image.

It is a further object of the present invention to provide a method for enlargement of input images with clarification by edge enhancement.

It is a further object of the invention to provide a method for enlargement of input images with clarification by edge enhancement which exploits human visual perceptual considerations to provide a perceptually sharper image.

These and other general objects of the invention are achieved by an image enhancement technique wherein an input image having spatial frequencies up to an initial maximum spatial frequency is processed to yield spatial frequencies exceeding the initial spatial frequency, while preserving phase characteristics of edges within the input image. More specifically, enhancement is achieved by augmenting the given frequency content of the input image by extrapolating to higher frequencies using shape-invariant properties of edges across scale. The augmentation procedure is based on the pyramid image representation and can be described using the scale-space formalism. This procedure includes an extrapolation across scale representations using a non-linearity that generates phase locked higher harmonics.

Method and apparatus embodiments of the invention are both described herein. The method and apparatus embodiments of the invention can be applied to static images such as photographs, or to time-varying images such as those contained in a video signal. The enhancement method described herein can be applied as an additional enhancement utility to conventional techniques.

In one embodiment of the present invention, a high frequency map $L_0$ is extracted from an input image $G_0$ using a spatially isotropic high frequency band pass filter. Subsequently an enhancing map $L_{-1}$ is generated by applying a non-linearity to $L_0$ that enhances the edges of the image, while preserving the phase of the edge transitions. The enhanced map $L_{-1}$ is added to the original image $G_0$, to produce an enhanced image $G_{-1}$.

In another embodiment of the present invention, a first image processing delay is connected in parallel with a filter branch. The outputs of the first delay and the filter processing branch are input in an adder element. The filter processing branch comprises a homogeneous filter element and a non-linear filter element connected in series. The homogeneous filter element comprises a second delay element, a convolution element, and a subtraction element. The input ports of the second delay and the convolution elements are connected to the input port of the first delay element. The output ports of the second delay and the convolution elements are connected to the input ports of a subtraction element. Images that are applied to the first delay appear enhanced at the output of the adder element.

Enlargement of input images results in blurring or reduced inherent sharpness. Enlargement coupled with edge enhancement results in a output images with restored inherent sharpness.

According to another method taught by the present invention related to enlarging and enhancing an image, an input image $G_0$ is expanded to an enlarged image $G_0^*$. Independently, a high frequency map $L_0$ is extracted from the input image $G_0$ using a spatially isotropic high frequency band pass filter. Subsequently, the high frequency map $L_0$ is expanded to an enlarged image $L_0^*$. Subsequently an enhanced map $L_{-1}^*$ is generated by applying a non-linearity to $L_0^*$ that enhances the edges of the image, while preserving the location of the edge transitions. The enhanced map $L_{-1}^*$ is added to the enlarged original image $G_0^*$, to produce an enlarged enhanced image $G_{-1}^*$.

In its various embodiments, the invention provides techniques for processing and enhancing two dimensional information signals, particularly video signals, to sharpen edges contained within the images. The overall simplicity of these techniques and ease of implementation allow for real time image processing applications such as video phones, television, image zooming, and the like.

BRIEF DESCRIPTION OF THE DRAWINGS

FIG. 8a represents an input edge, $G_0$.

FIG. 8b represents the pyramidal component $L_0$ of $G_0$.

FIG. 8c represents the ideal desired pyramidal component $L_{-1}$ of $L_0$.

FIG. 8d represents the enhanced edge $G_{-1}$ resulting from the addition of $G_0$ and $L_{-1}$.

FIGS. 8e through 8h represents exemplary edge enhancement, namely:

FIG. 8e represents an input edge, $G_0$.

FIG. 8f represents the pyramidal component $L_0$ of $G_0$.

FIG. 8g represents the nonlinear component $L_{-1}$ of the pyramidal component $L_0$, generated by the non-linear filter of the present invention.

FIG. 8h represents the non-linearly enhanced edge, generated by the present invention.

FIG. 9a shows diagrammatically the spatial frequency contents of an input image $G_0$, three subsequent higher Gaussian components $G_1$, $G_2$, and $G_3$, and an edge enhanced output image $G_{-1}$.

FIG. 9b shows diagrammatically the edge map spatial frequency contents of $L_0$, two subsequent Laplacian components $L_1$, $L_2$, and an enhancing component $L_{-1}$, predicted by the present invention.

DETAILED DESCRIPTION OF THE INVENTION

Figure 1:
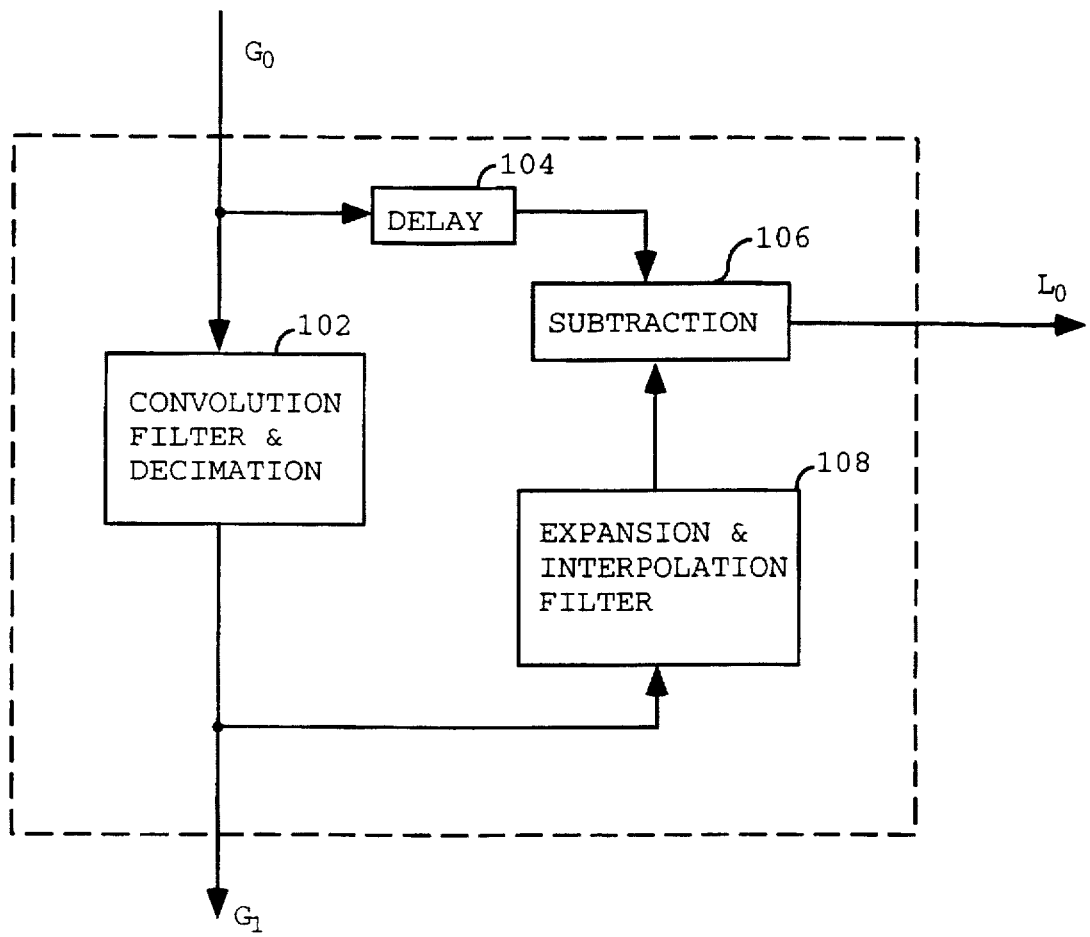
FIG. 1 illustrates a block diagram of a stage of a Burt Pyramid image analysis algorithm.

In the following description, for purposes of explanation, numerous details are set forth in order to provide a thorough understanding of the present invention. However, it will be apparent to one skilled in the art that these specific details are not required in order to practice the present invention. In other instances, well known data processing structures are shown in block diagram form to not unduly obscure key aspects of the present invention.

The invention relates to edge enhancement of input images. First a definition of "edges" is provided and then an edge enhancement method is described in the terms of pyramid representation. Subsequently a method and apparatus are described for practicing the present invention. Finally preferred apparatus are described such as enhancing video display and storage.

Subsequently a method and apparatus are described for enlarging an image and restoring its sharpness by edge enhancement according to the present invention.

Image Sharpening By Edge Enhancement

Edge enhancement can improve the clarity of input images without requiring the system to handle excessive amounts of data. Edges are an important characteristic of images, since they correspond to object boundaries or to changes in surface orientation or material properties. Most images have edges which appear as discontinuities in gray level and are intimately associated with spatial frequencies. A sharp edge corresponds to a localized high frequency. It is generally assumed that two regions separated by an edge boundary have sufficiently homogeneous image brightness within each region, so that the transition between two regions can be detected on the basis of gray-level discontinuities alone.

Edges can be characterized on two levels. On a first, signal processing level, edges can be thought of as ensembles, sets of successive samples within one dimension, whose level-values contain a mathematical edge function.

On a second, mathematical level, the term edge is shorthand for mathematical edge functions, present in the information component as substantial jumps in the localized average value of the level-values of samples (or pixels) taken serially along any one dimension. These level values taken serially along any one dimension define an image brightness function. Therefore, edge functions are local segments of interest of an image brightness function. The same actual visual image edge may define one or two edge functions across different neighboring series of successive samples within one or two dimensions.

Edge enhancement techniques face the problems of edge definition, edge detection and edge enhancement. Each image processing technique solves these three problems differently. The edge definition problem is solved through a determination of how sharp and how large of a change in the image brightness function that defines an edge is of interest. Detection and enhancement are explained below.

Edge functions differ on the amount of the discontinuity in gray level and in the number of pixels used to attain this discontinuity. Typically, an edge function is a monotonically increasing or decreasing function over many pixels. Theoretically, it is possible to observe the entire discontinuity of interest within only two pixels.

An image processing scheme can discriminate between edge functions, and select only edge functions of interest. The edge functions of interest to the present invention are high-contrast and about 4–8 pixels wide. That is they are edges that rise quickly, but not too quickly, so that there is room for sharpening.

Actual visual image edges can be horizontal, vertical, or at an angle in between a rectangular two-dimensional information component. Edge detection techniques are sometimes partial to a specific direction, such as the horizontal, vertical, or main diagonal. Other times, edge detection techniques do not distinguish directions, and are considered to be spatially isotropic.

An edge can be characterized mathematically by a local peak in the first derivative of the image brightness function, or by a zero in the second derivative, the so called main zero crossing (ZC).

Therefore, edges can be detected by convolving the input image with filter masks that extract the second gradient. This is also the thrust of the prior art for edge detection schemes.

Pyramid Representation of the edge enhancement scheme

Although the methods of the present invention do not require the generation of a complete pyramid of Laplacian edge-maps, certain aspects of the invention are best understood and appreciated when analogized to pyramidal techniques.

In the analysis stage of the pyramidal representation, an input image $G_0$ is decomposed into a Laplacian $L_0$ and Gaussian $G_1$; then $G_1$ is decomposed into $L_1$ and $G_2$, etc., for N stages. What is transmitted is the last stage $G_N$ and the N edge maps ($L_0$, $L_1$, ... $L_{N-1}$). In the synthesis stage, the Gaussian $G_1$ are generated back by recursively adding back the corresponding Laplacians. The last such addition is:

$$G_1 + L_0 \rightarrow G_0 \qquad (2)$$

whereby the input image $G_0$ is thus reconstructed.

The bandwidths of the pyramid components are illustrated in FIGS. 9a and 9b. The input image $G_0$ is distributed over the spectrum of 0 to $f_0$ where $f_0$ is the highest spatial frequency of interest. The extracted edge map $L_0$ is shown in FIG. 9b to be contained within the spectrum of $f_0/2$ and $f_0$. Once $L_0$ has been extracted, $G_0$ can be decimated resulting in $G_1$, without loss of information. The bandwidth of $G_1$ is shown in FIG. 9a to be within 0 and $f_0/2$. This way, $G_0$ has been decomposed to $L_0$ and $G_1$. Subsequently, $G_1$ can be decomposed to $L_1$ and $G_2$, whose bandwidths are also seen in FIGS. 9a and 9b. It should be noted that the vertical axes in FIGS. 9a and 9b do not convey a quantitative meaning such as amplitude.

Edge Enhancement

The method of the invention effectively operates to predict an enhanced component $L_{-1}$, which is in turn added to the input image $G_0$ to produce $G_{-1}$, according to Equation (3), with $G_{-1}$ being sharper than the input image $G_0$.

$$G_0 + L_{-1} \to G_{-1} \qquad (3)$$

The pyramid synthesis process is thus continued one step further, to expand $G_0$ non-linearly in frequency space to $G_{-1}$. The enhanced component $L_{-1}$ is within the band of $f_0$ to $2f_0$, which corresponds to an extrapolation into spatial higher frequency space than was originally available. If the specific extrapolation scheme results in an $L_{-1}$ that has remaining low-frequency components (i.e. within the band of 0 to $f_0$), then further processing is preferred to remove them, before adding $L_{-1}$ to $G_0$.

FIGS. 8a to 8h illustrate in detail enhancement of a one-dimensional edge $G_0$. In each of FIGS. 8a to 8h, the horizontal axis corresponds to the abscissa of an image brightness function, and the vertical axis corresponds to the ordinate of the image brightness function. In applications, the abscissa comprises a set of samples taken serially within one dimension, and the ordinate describes the respective level-values of the samples of the abscissa.

FIGS. 8a through 8d illustrate the theoretical background of the present invention. FIGS. 8e through 8h illustrate a function described by the level values of six pixels and help visualize how the invention works in practice. Notice that no one sample contains the mathematical zero crossing, which is somewhere in between two neighboring samples.

Figure 8A:
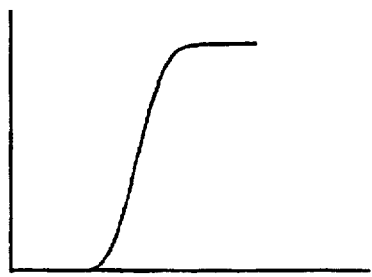
FIGS. 8a through 8h illustrate stages of edge enhancement, namely.
Figure 8B:
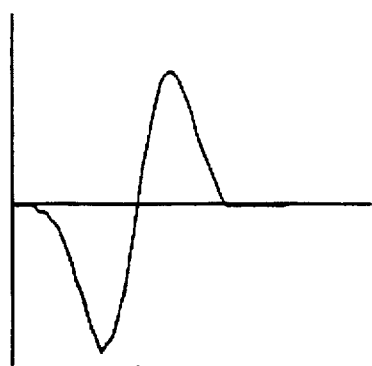
Figure 8C:
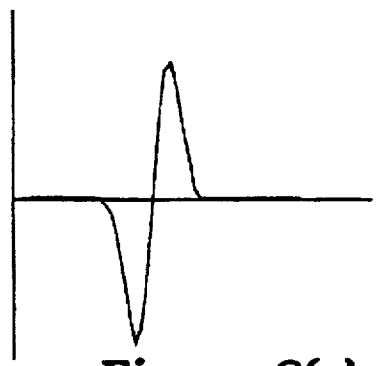
Figure 8D:
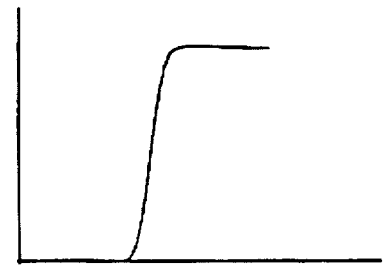
Figure 8E:
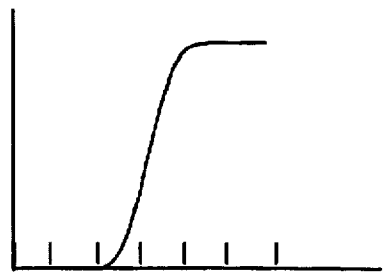
Figure 8F:
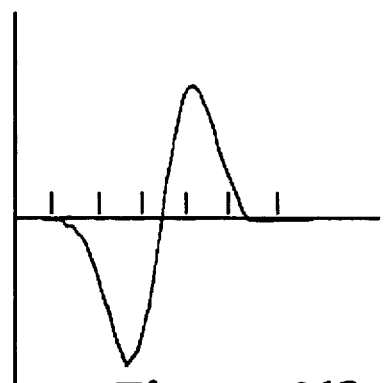

The given image $G_0$ contains an edge function as shown in FIGS. 8a and 8e. The pyramidal component $L_0$, shown in FIGS. 8b and 8f, corresponds to the negative second derivative of the edge function shown in FIGS. 8a and 8e. The ideal higher frequency component $L_{-1}$, shown in FIG. 8c, preserves the shape and phase of $L_0$ by having its zero crossing at the location that corresponds substantially close to the location of the zero crossing of $L_0$. Once generated, $L_{-1}$ (shown in FIG. 8c) is added to $G_0$ (shown in FIG. 8a) to produce an ideal sharp edge $G_{-1}$, shown in FIG. 8d.

The objective is to form the next harmonic $L_{-1}$ of the given signal $L_0$, while keeping the phase of $L_0$. Another name for the desired wave form is phase-coherent higher harmonic. The idealized objective $L_{-1}$ shown in FIG. 8c has the same shape and phase on the edge map $L_0$, shown in FIGS. 8b and 8f, but has higher spatial frequency.

Figure 8G:
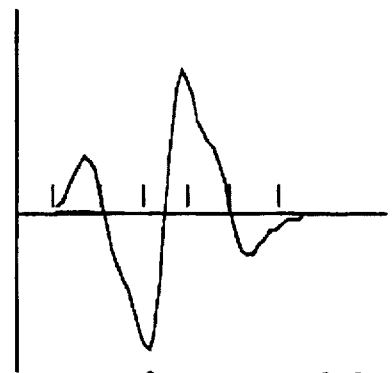
Figure 8H:
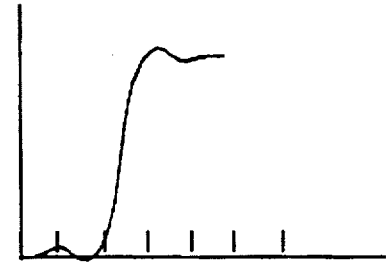

One way to create the desired $L_{-1}$ is to first extract an edge map, $L_0$ from the input image $G_0$. This can be accomplished by a high pass filter, or by an analysis stage of a spatial frequency analysis pyramid. By way of example and not of limitation, high pass filtering techniques include techniques whereby a low-pass filtered version of an input image is subtracted from itself. The second step to creating the desired $L_{-1}$ is to multiply the extracted $L_0$ response by a first constant, bound or clip the resultant wave form by the absolute value of a second constant, and then optionally remove the low-frequencies present in order to extract a high-frequency-only response. The resulting wave form is shown in FIG. 8g. The enhanced edge output corresponding to the addition of the wave forms in 8e and 8g is presented in FIG. 8h.

An important aspect of this invention is that the location of the zero crossing is substantially preserved, for an edge, as the resolutions change. Often, preserving the location of the edge zero crossings is also referred to as preserving the phase.

The creation of an $L_{-1}$ with the same shape and phase as $L_0$ is analogous to starting with $L_0$ and shifting to higher resolutions. This nonlinear extrapolation exploits the shape-invariant properties of edges across scale, that is with respect to different resolutions. The Laplacian pyramid is a special case of the wavelet representation and as such it preserves the shape and phase of the edge maps across scale. Edges are thus represented similarly across all scales.

The pyramid representation can be viewed as a discrete version of the scale-space description of ZC which has been introduced in the literature. Therefore, the result produced by using the pyramid representation will not be adversely affected by shifting to higher resolutions.

The scale-space formalism gives the position of the ZC across a continuum of scales. One of the main theorems states that the ZC of an image filtered through a Gaussian filter have nice scaling properties, i.e., a simple behavior of ZC across scales. ZC are not created as the scale increases. It is noted that if an edge appears at lower resolutions of the image, it will consistently appear as higher resolutions are shifted to.

Additionally, the non-linearity of the $L_{-1}$ map is introduced by a bounding function, and preserves the phase of the edges without shifting them, following the scale-space formalism.

Preferred Embodiments

Referring to FIGS. 4–7 and 10–13, preferred embodiments of the invention will now be described.

The input $G_0$ is an information component contained in a temporal signal as level values of certain samples that define a number of dimensions. This number of dimensions is typically one for acoustical applications and two for visual image applications. Often the signal has been decomposed in samples, and the input $G_0$ is therefore a sample stream. For visual image applications, the samples are often referred to as pixels.

Figure 10:
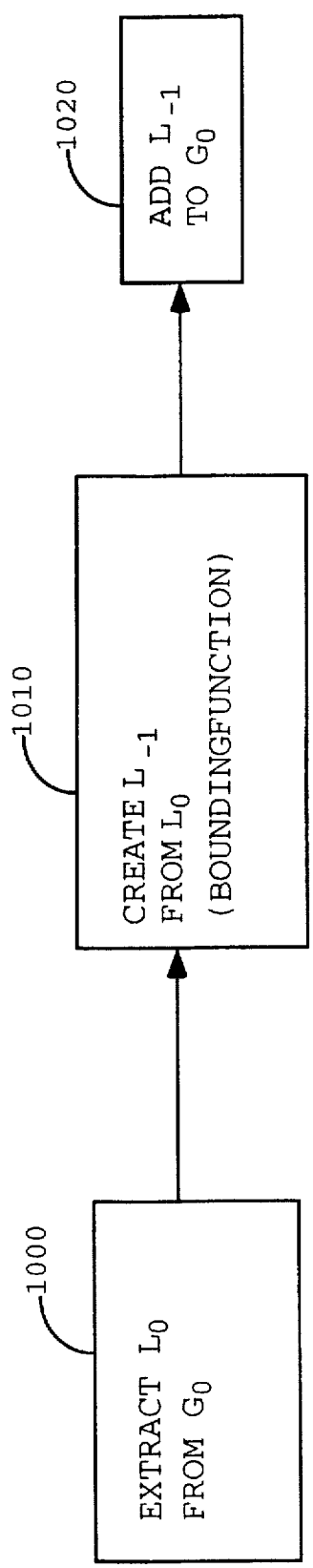
FIG. 10 illustrates a method of enhancing images according to the present invention.

A block diagram of a method to practice the present invention is generally illustrated in FIG. 10.

Referring to FIG. 10, as a first step 1000 of a method of practicing the invention, an edge map $L_o$ is extracted from an n-dimensional input image $G_o$ contained as information defined by level values of an input sample stream, where n is a positive integer. The edge map $L_o$ is an information component signal comprising edge samples individually corresponding to at least some of the certain samples of the input sample stream. The information is defined by the level values of at least some the edge samples, and in the same number of dimensions n as the input sample stream. There is no need that there be an edge sample for each and every one of the certain samples of the input stream. However, having an edge sample for every one of the information carrying certain samples of the input stream is a preferred mode because it will make subsequent processing steps easier. The edge samples have Laplacian features which are sets of samples with level-values that define Laplacian functions, when taken serially along one dimension. Each Laplacian function corresponds to each edge function of interest of input image $G_o$. Each Laplacian feature is contained in an ensemble of edge samples called an edge ensemble.

As previously mentioned, a key aspect of edge features (Laplacians) is a main zero crossing at a place near the center of the edge function of interest. When implemented, the zero crossing of the edge features (Laplacians) may or may not be contained at an actual pixel. It is possible that, of two successive edge samples in a single dimension, one has a positive level-value and one has a negative level-value, with the zero crossing occurring somewhere between them. Additionally, edge center samples are substantially in the middle of the ensemble of pixels that contain the Laplacian feature.

The edge map Lo may further comprise edge control samples that are useful for coordinating data processing. Control samples do not contain information and are peripheral to the calculation.

Step 1000 can be performed by using an analysis step of a Burt pyramid or of a Filter-Subtract-Decimate pyramid device (preferably without the "Decimate" step), or a band pass filter.

As a subsequent step 1010 of the method of practicing the invention, an enhanced map $L_{-1}$ is extracted from edge map $L_o$. The enhanced map $L_{-1}$ is an information component comprising enhancing samples individually corresponding to at least some of the edge samples of the edge map $L_o$. The information is defined by the level values of at least some the enhanced samples, and in the same number of dimensions n as the input sample stream. Step 1010 can be performed by multiplying all level-values of all edge samples of the edge map $L_o$ with a first constant, and then "clipping" the resultant wave form by the absolute value of a preset clipping level-value. According to this clipping technique, positive input level-values higher that the positive of the clipping level-value are set equal to the positive of the clipping level-value. Further, negative input level-values smaller than the negative of the clipping level-value are set equal to the negative of the clipping level-value. The remaining input level-values remain unaffected.

The enhanced samples of enhancing map $L_{-1}$ individually correspond to the edge samples of the edge map $L_0$. Therefore, the enhanced samples individually correspond to the certain samples of the input sample stream $G_0$. Again there is no need that there be an enhanced sample for every one of the edge samples of the edge map. However, having an enhanced sample for every one of the edge samples of the edge map is a preferred mode because it will make a subsequent step easier. When taken serially along one dimension, the enhanced samples have level-values that define an enhancing function for each edge of interest that is similar in shape with and preserves the phase of the second derivative of an edge function. Each enhancing function is substantially contained in an ensemble of enhancing samples called a high frequency feature. The enhanced functions also have zero crossings at pixels that further correspond to the edge center pixels of the Laplacian map. Additionally, the enhanced map may further comprise enhancing control samples.

As a final step 1020 of a method to practice the present invention, the enhanced map $L_{-1}$ is added to the input image $G_0$ in phase. "In phase" means that every pixel sample is input and processed simultaneously with the pixel it corresponds to of the other input stream. The result of the addition is an information component $G_{-1}$ defined by the level-values of the output samples. The information component $G_{-1}$ is an edge-enhanced image of the original image $G_0$.

Figure 4:
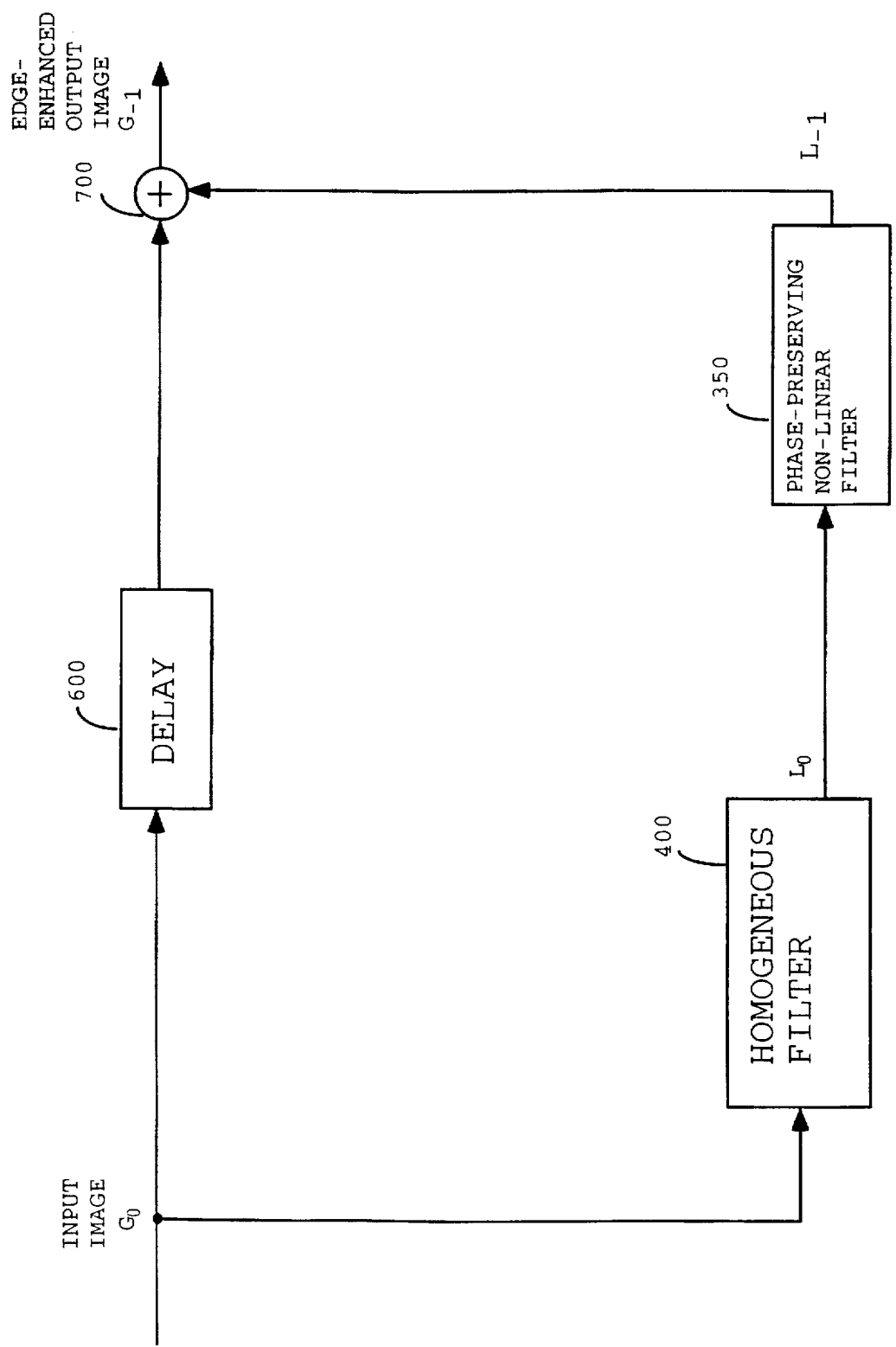
FIG. 4 illustrates a block diagram of an image enhancement system of the present invention.

A block diagram of an enhancement apparatus is generally illustrated in FIG. 4 and main components thereof will now be described.

An input image $G_0$ is applied to the input terminal of a band pass filter that is preferably a homogeneous or spatially isotropic filter 400 to produce an edge map $L_0$, otherwise known as a zeroth-order Laplacian of the image. The output of isotropic filter 400 is connected to the input of phase-preserving non-linear filter 500. The edge map $L_0$ is thus input to phase-preserving non-linear filter 500, which therefore produces an enhanced map $L_{-1}$. The output of the phase-preserving non-linear filter 500 is connected to an input port of adder element 700.

Input image $G_0$ is also transmitted through a delay element 600, whose output port is connected to another input port of adder element 700. Thus the enhanced map $L_{-1}$ is added to the delayed input image $G_0$ by adder 700 to produce an edge enhanced image $G_{-1}$ at the output port of adder element 700. The addition is in phase, accomplished by controlling the delay amount of delay element 600.

The edge map $L_0$, the enhanced map $L_{-1}$ and the enhanced image $G_{-1}$ are information components contained in a temporal signal as level values of samples that define the same number at dimensions as the applied input sample stream.

The edge map $L_0$ comprises edge samples that individually correspond to each of some of the samples of the input temporal sample stream $G_0$. The edge samples have level values that define Laplacian features or edge features which correspond individually to edge functions of edges of interest. Each Laplacian feature is contained in an ensemble of edge samples called an edge ensemble. Additionally, the edge map $L_0$ may comprise control samples.

Further, the enhanced map $L_{-1}$ comprises enhanced samples that individually correspond to each of some of the edge samples of the edge map $L_0$. The enhanced samples have level values that define enhanced functions which individually correspond to edge features. Some of the enhanced samples, therefore, correspond individually to input samples, and some of the enhanced functions correspond individually to edges. Each enhanced function is contained in an ensemble of enhanced samples called a high frequency feature. Additionally, the enhanced map may comprise control samples.

Figure 2:
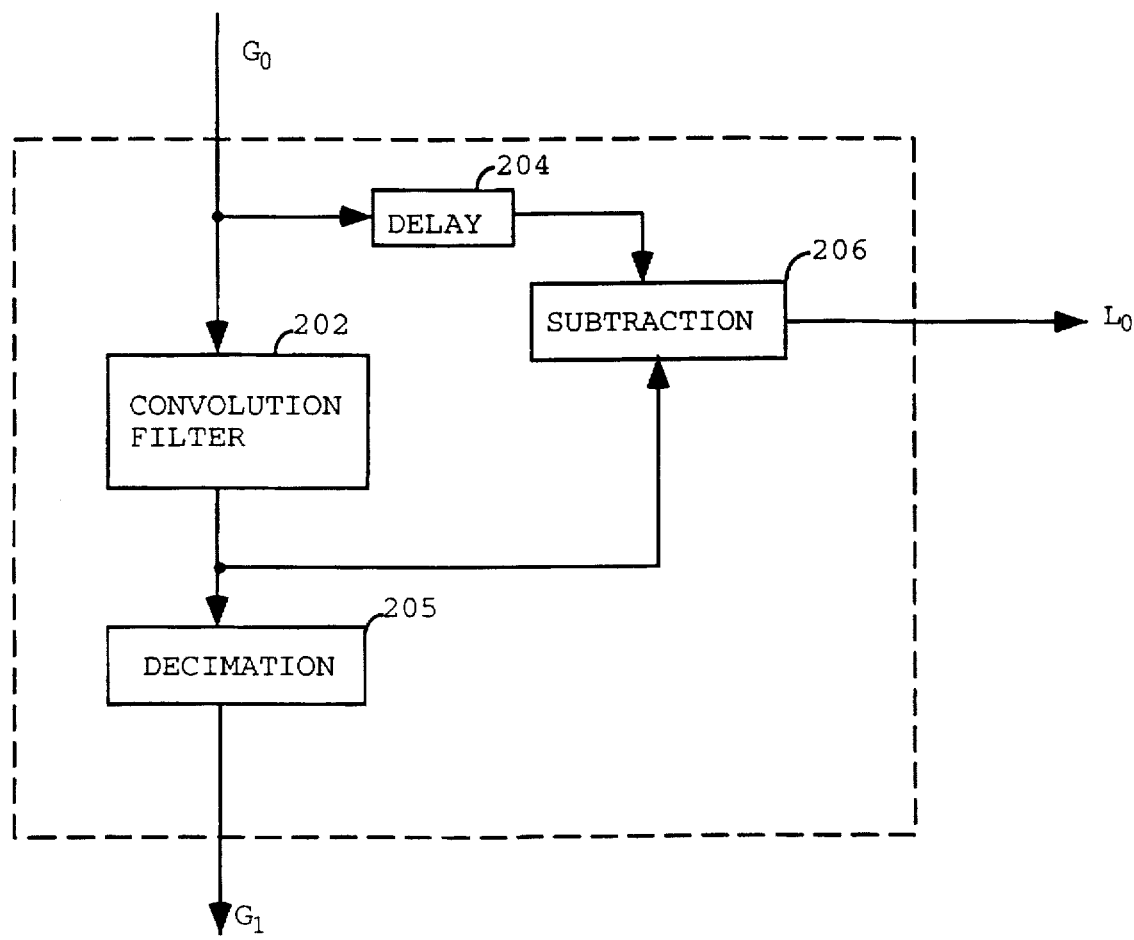
FIG. 2 illustrates a block diagram of a stage of a Filter-Subtract-Decimate (FSD) Pyramid image analysis algorithm.
Figure 3A:
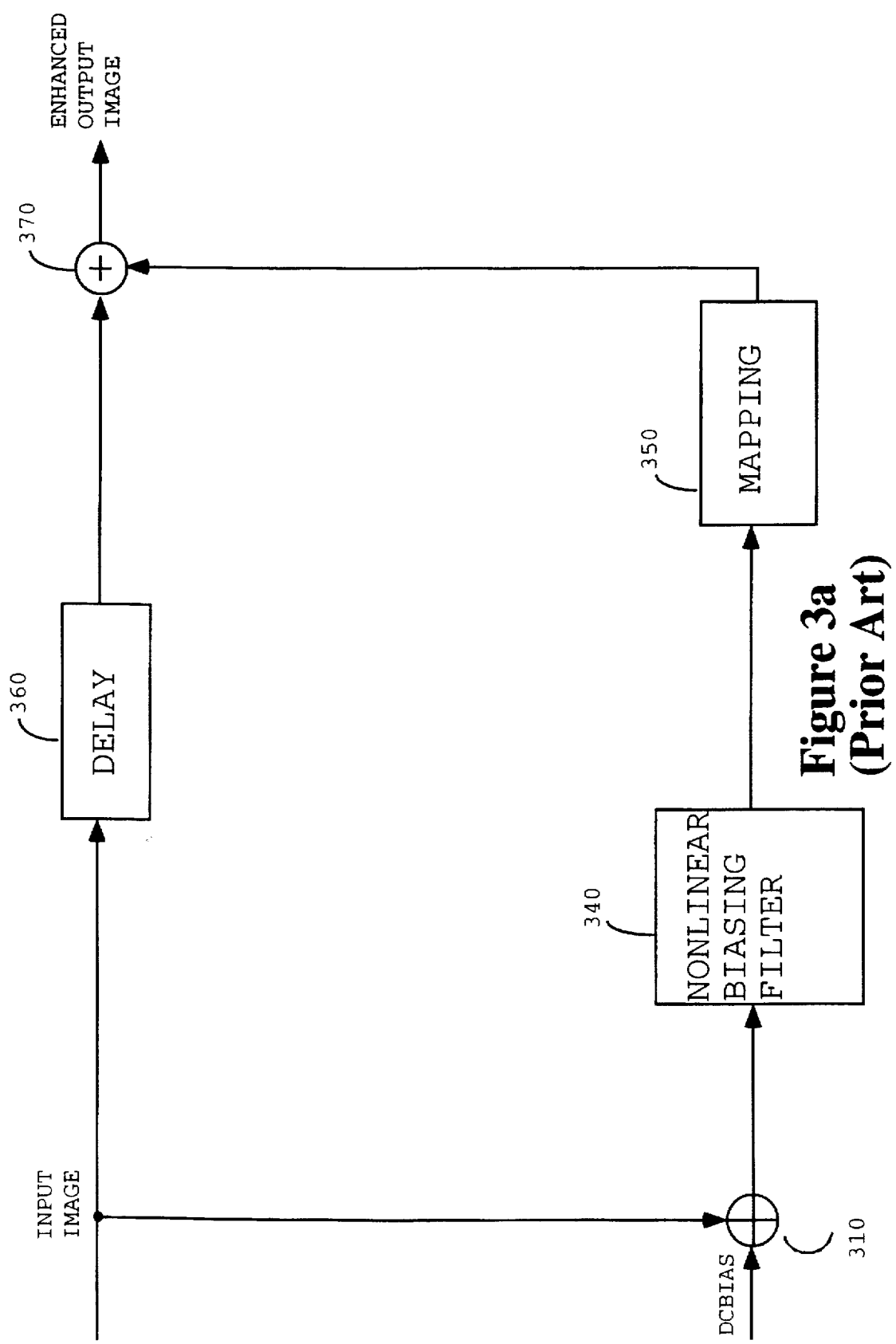
FIG. 3a illustrates a block diagram of an image enhancement apparatus proposed by Mitra.
Figure 3B:
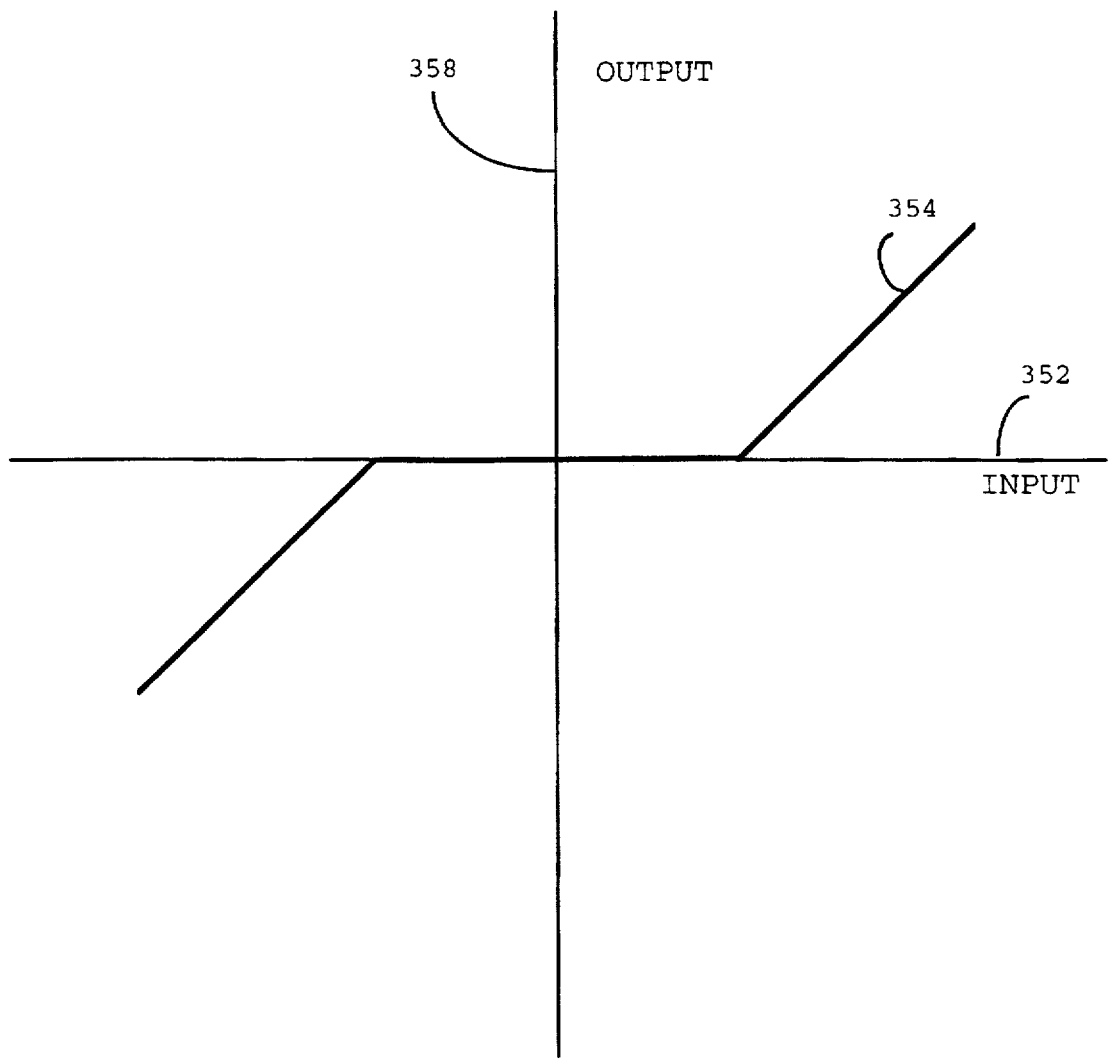
FIG. 3b shows a graph of a mapping function versus an input value used in accordance with a mapping element of Mitra.

As noted, filter 400 operates to generate edge map $L_0$. Any of a variety of filtering techniques may be employed by filter 400 to generate a zeroth order Laplacian $L_0$. For example, filter 400 may implement an analysis step of the Burt Pyramid algorithm (FIG. 1) or an analysis step of the FSD Pyramid algorithm (FIG. 2) to generate edge map $L_0$. Additionally, by way of example and not of limitation, a zeroth order Laplacian $L_0$ can be generated by a high pass filter. Preferably, filter 400 of FIG. 4 implements an FSD Pyramid algorithm, optionally excluding the decimation step. (The decimation step is only necessary to generate the next higher order Gaussian component $G_1$, which is not used in this application. The decimation step is not necessary to generate the $L_0$ edge map.)

Figure 5:
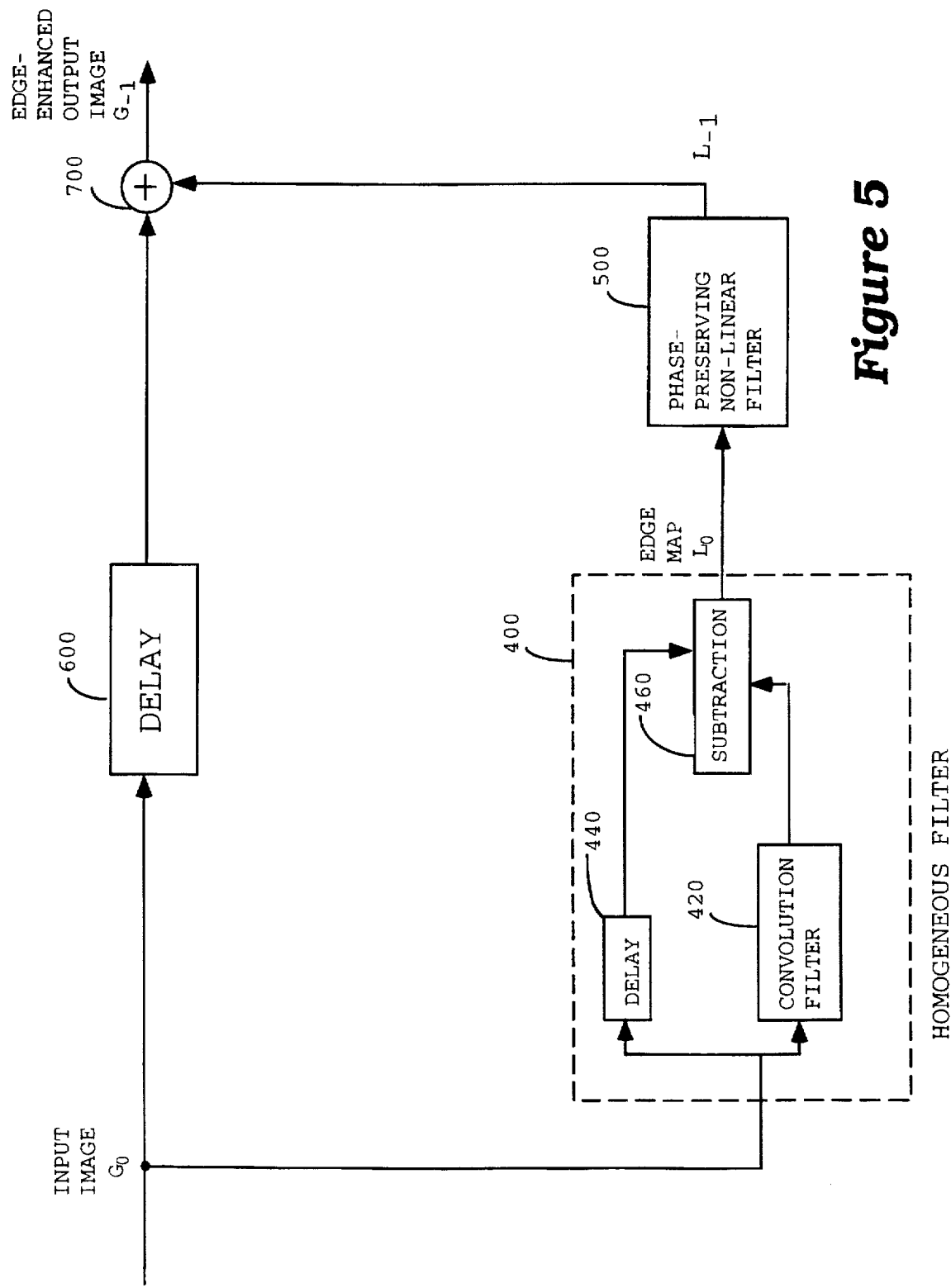
FIG. 5 illustrates a preferred embodiment of the image enhancement system of FIG. 4.
Figure 6:
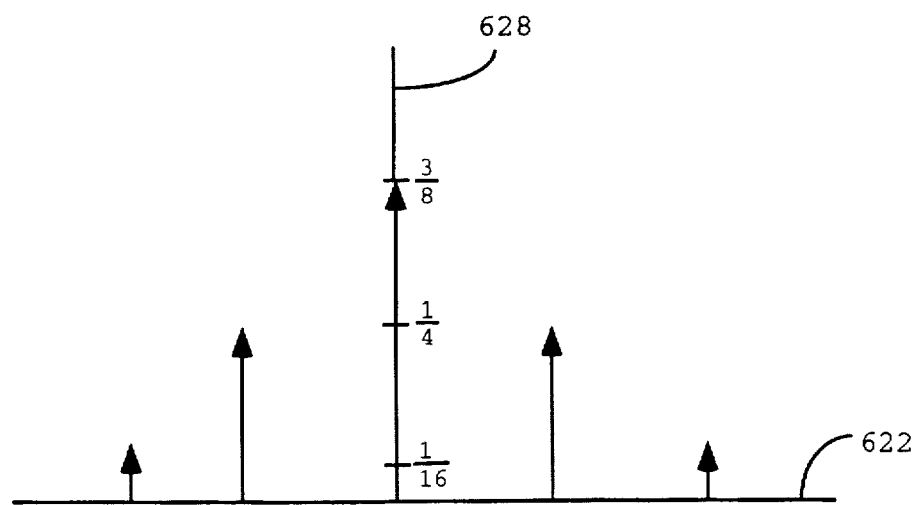
FIG. 6 shows an illustrative example of kernel weighting function in accordance with the image enhancement system of FIG. 4.

A preferred embodiment of the present invention is illustrated in FIG. 5. The same components are shown as in FIG. 4, but in more detail.

Within FIG. 5, filter 400 is represented with a set of sub-elements corresponding to an FSD technique excluding a decimate step. Specifically, filter 400 includes a convolution filter 420, a delay element 440 and a subtraction element 460.

The input image $G_0$ is simultaneously applied to the input terminals of delay means 440 and convolution filter 420. The convolution filter 420 convolves the input image at every sample location by a symmetric kernel that optimally has a low pass filter (LPF) characteristic. Convolution filter 420 therefore outputs an LPF version of $G_0$. The output port of the convolution filter 420 is connected to the subtrahend terminal of subtraction element 460.

Delay means 440 delays the input signal $G_0$ by the same amount of time as is expended by the convolution filter 420. The output port of the delay means 440 is connected to the minuend terminal of subtraction element 460.

The output of convolution filter 420 is thus subtracted from the output of the delay means 440 in phase by subtraction element 460. Accordingly, the function of the delay means 440 is to ensure that subtraction in subtraction element 460 is performed in phase. The LPF version of $G_0$ is thus subtracted from $G_0$, to produce the edge map $L_0$ of the homogeneous filter 400 at the output port of subtraction element 460. The edge map has edge features (Laplacians) that are similar to the negative of the second derivative of the edge functions, i.e. of the image brightness functions of the edges.

The output port of subtraction element 460 is connected to the input port of phase-preserving non-linear filter 500. The edge map $L_0$ is thus subsequently processed by the non-linear filter 500. An enhanced map $L_{-1}$ is thus produced at the output port of non-linear filter 500. The enhanced map has enhancing functions for each edge that are similar in shape and preserve the phase of the second derivative of an edge function. The enhanced functions also have zero crossings at pixels that further correspond to the edge center pixels of the Laplacian map that contain or are substantially near the edge pixels with Laplacian main zero crossings.

The output port of non-linear filter 500 is connected to one of the input ports of adder element 700.

The input image $G_0$ is also transmitted through delay element 600. A delayed version of input image $G_0$ therefore is provided to the output port of delay element 600, which is connected to another of the input ports of adder element 700.

The enhanced map $L_{-1}$ is thus added to the input image $G_0$ in phase. The result of the addition is an edge-enhanced image $G_{-1}$ appearing at the output port of adder element 700, and contained as an information component in produced pixels. The enhanced image $G_{-1}$ has been delayed in real time with respect to the input image $G_0$, by the amount of delay 600 plus the delay imparted by the adder element 700.

Optimizing Considerations

The invention works better for input signals that are digital as opposed to analog. Where the input signals are analog, signal sampling means are best employed. The signal sampling means preferably includes standard Analog to Digital Converter circuits. The sampling rate is best chosen as slightly higher than twice the temporal bandwidth of the analog input channel to satisfy the Nyquist sampling criterion. If sampling is performed at a slower rate, aliasing will be introduced. Then $f_0$ will be half the sampling rate.

In selecting $f_0$, some considerations should be kept in mind. First, in every image, the power in the edges decreases, as the spatial frequency increases. As will be described below, the bounding function of the nonlinear filter does not exhibit non-linearity if all amplitudes are below the clipping value (an optimum value of which is given below as 10/256 or about 4%). Therefore, the $f_0$ has to be set low enough to where the amplitudes exceed the clipping value.

Further, the $f_0$ has to be set high enough to make a difference, that is provide new information. A preferred starting point is for $f_0$ to be at half the sampling rate.

As noted above, any of a number of filtering techniques may be employed for generating $L_0$. However, certain filtering techniques may be more effective than others. It has been found that a 5*5 mask filter is effective for extracting the $L_0$ edge map. More specifically, a separable low pass filter (LPF) of the form: [1/16, 1/4, 3/8, 1/4, 1/16] works very well. If fewer multiplications are required, a 3*3 filter can be used. The kernel of the separable linear filter used is shown on FIG. 6. Specifically, the horizontal axis 622 has units of number of pixels. In this application, the center pixel is used for convolution, along with two neighboring pixels on each side. The vertical axis 628 shows the level values to be applied in performing the convolution.

The quality of the results is affected by the non-linearity used to generate $L_{-1}$. A nonlinear function that has been found to be effective is $$L_{-1} = \text{CONSTANT} * (\text{BOUND}(L_0)) \quad (2)$$

where BOUND(S) is the following function:

$$\text{BOUND}(S) = \begin{vmatrix} T \text{ if } S > T \\ S \text{ if } -T \leq S \leq T \\ -T \text{ if } S < -T. \end{vmatrix}$$

Figure 7:
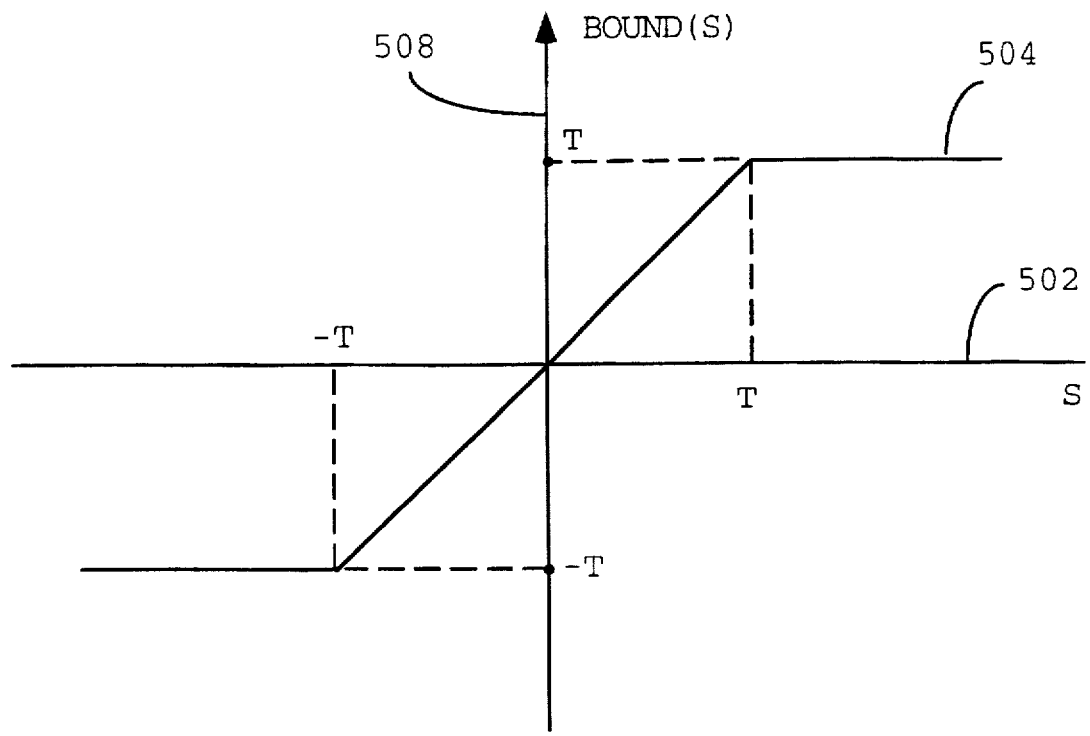
FIG. 7 shows a graph of a bounding function versus an input value used in accordance with the invention.

The function BOUND(S) is graphed in FIG. 7. In experimenting with these values, parameters are preferred which sharpen the edges of the image without substantial ringing. Experiments have indicated that a suitable value for CONSTANT is 6, and for T is 0.04 $[G_0]_{MAX}$ (i.e. 10 out of 256).

The non-linearity stage involves the multiplication of the $L_0$ map with a scalar and then bounding or clipping the resultant image. The scalar multiplication can be incorporated as a filter gain, or as part of a look-up table.

A tradeoff exists between high-frequency enhancement and noise generation in the form of ringing. The enhancement method of the present invention is most effective when applied to input images which have been previously processed for noise. One possibility, therefore, is to use conventional reconstruction schemes to remove noise, and then enhancing the resultant image with the system of the invention.

If resources allow, a second filtering stage is preferably added to remove any low-frequencies present in the resultant $L_{-1}$ map, thus adding only the high-frequency response to the given input $G_0$. However, experiments have shown that the second filtering operation is not critical for achieving good enhancement results and is not needed for most real-time application domains.

General Applications

The present invention can be applied as an additional enhancement utility to any other signal processing method. Since it assumes no degradation model, this enhancement utility is ideally suited to applications where a degradation model is not available.

The method and apparatus embodiments of the invention can be applied to static images such as photographs, or to time-varying images such as those contained in a television signal. The enhancement method of the present invention is preferably implemented at the receiving end of a communication link, thereby not requiring increased bandwidth of the communication channel. As such, the technique is equivalent to data compression, because less bandwidth is needed to transmit the same amount of information.

Images contained in video signals are enhanced according to the present invention. It will be apparent to a person skilled in the art how to implement the details of the invention, from the explanations provided herein. The greatest improvement in image quality that can arise as a result of using the present invention is in applications where image enhancement is performed in conjunction with enlargement, such as for example in advanced definition TV, or high definition computer screens, etc.

Figure 11:
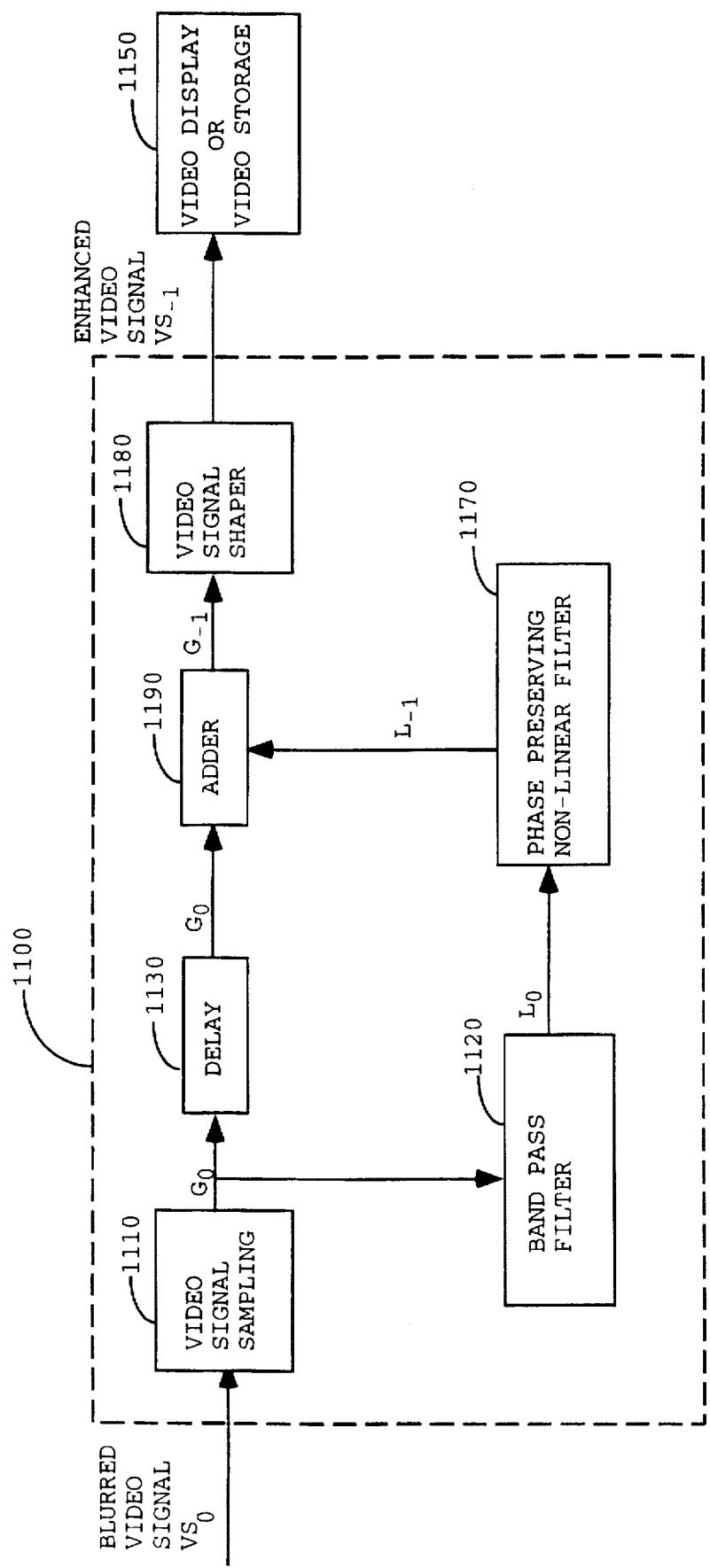
FIG. 11 illustrates a block diagram of an Advanced Definition TV according to the present invention.
Figure 13:
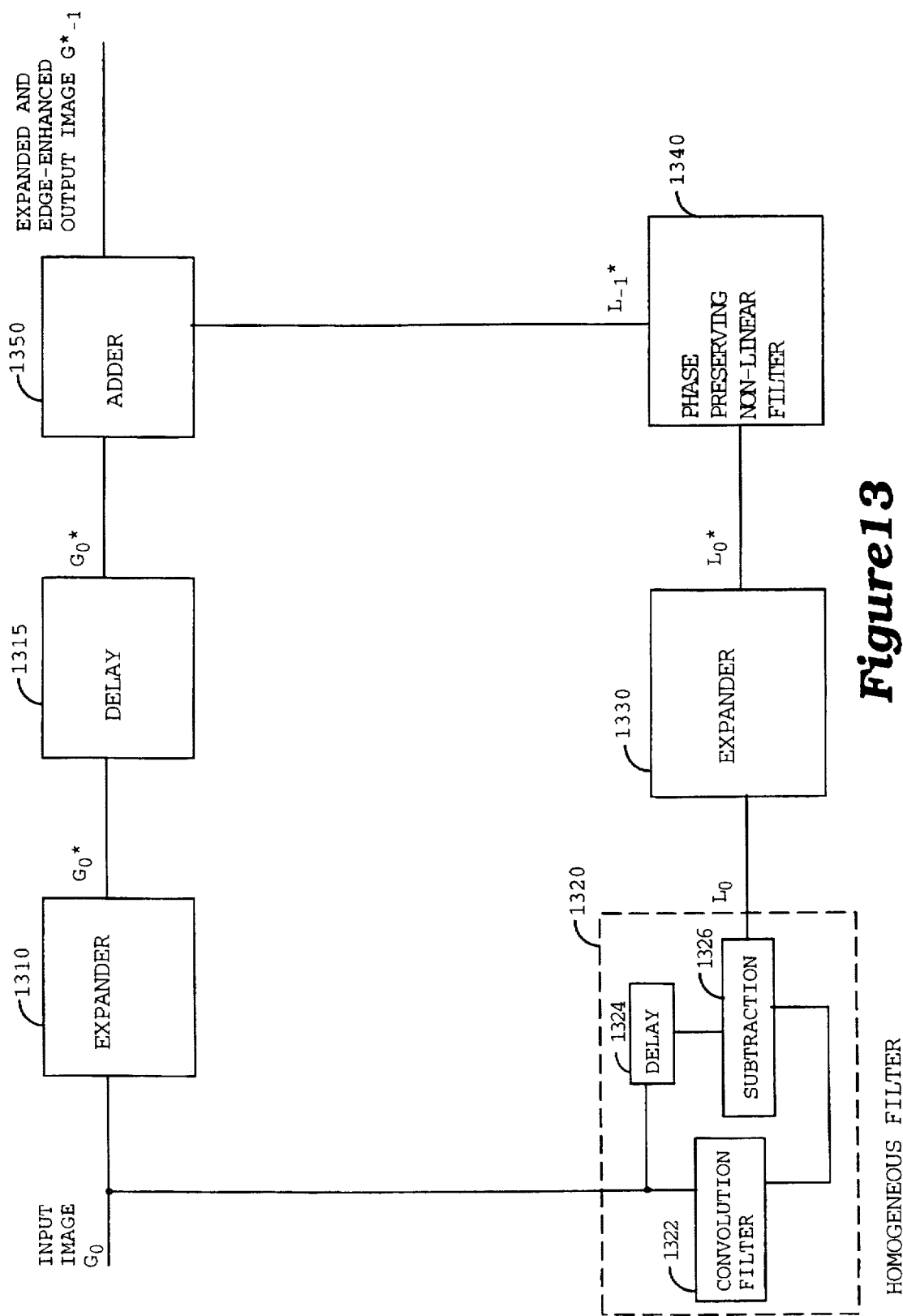
FIG. 13 illustrates a block diagram of an image enlargement and enhancement system according to the present invention.

In FIG. 11 and its accompanying explanation, it is shown how to enhance a video signal that may not necessarily be in digital form. In FIG. 13 and its accompanying explanation, it is shown how to expand and enhance a video signal that is in digital form. The two can be combined to create an apparatus that expands and enhances a video signal that is not necessarily in digital form.

Apparatus for enhancing video signals.

As used herein, "video signal" is a generic term for a signal that defines a temporal visual image. Video signals are usually applied to an image display apparatus or to a storage medium. Examples of image display apparatus are TVs, computer screens, motion picture screens, closed circuit TV screens, videophone screens, etc. In such apparatus, the present invention is best implemented as an enhancement utility, preferably interposed between the video signal input terminal and the processing and display component of the image display apparatus. Examples of storage media are video tapes, film, and Random Access Memories. Video signals are stored in storage media when applied to video storage apparatus, such as VCRs in recording mode. For such apparatus, the present invention is best implemented as an enhancement utility preferably prior to recording the video signal on to the storage medium, as with the image display apparatus explained above.

As stated above, techniques of the invention may be more effective for digital than for analog input signals. An embodiment of the invention is readily implemented to enhance digital video signals, such as those of a closed circuit TV. To process input video signals that are analog, signal sampling means are preferred that will convert the analog component of the input signal into digital for enhancement. Further, the enhanced digital signal should to be converted back to analog signal of the same format as the input signal, thus necessitating a signal shaping means. More details of signal sampling and signal shaping means are given below.

A preferred embodiment of an apparatus for enhancing video signals according to the present invention is illustrated in FIG. 11, and will now be described. An edge enhancement apparatus 1100 is interposed between the incoming video signal $VS_0$ and image display apparatus 1150. The edge enhancement apparatus 1100 receives a signal $VS_0$ that contains an input image and produces a signal $VS_{-1}$ that contains an edge enhanced version of the input image that is input in the image display apparatus 1150, instead of the incoming video signal $VS_0$.

The comments in this section are generic, and apply to all specific applications that will be developed below. The incoming signal $VS_0$ has a predetermined format that is well-known in the art to which it is applied. Specifically, the incoming video signal $VS_0$ comprises a predetermined mixture of control samples and information signal that usually arrive in periodic sets that correspond to successive images for display in the image display apparatus or storage medium.

Referring to FIG. 11, processing is needed to convert the incoming video signal $VS_0$ into samples or pixels usable by the present invention. Such processing is accomplished by a Video Signal Sampling element 1110 that has the capability to interpret the control and information signals of every frame and convert the signals to a format compatible with a format of a standard embodiment of this invention. By way of example and not of limitation, the Video Signal Sampling element 1110 might comprise a wave form sampling element and an Analog to Digital converter. Optionally, the Video Signal Sampling element 1110 might further comprise an element that assembles a serially input frame into a two-dimensional digitized picture that is output in parallel, to facilitate further processing.

In other embodiments of the present invention, such as closed circuit TV, the remainder of the enhanced circuit as a whole can be specially adapted to the input signal, so that the presently described Video Signal Sampling element 1110 and the subsequently described Signal Shaper element 1180 are not necessary.

The incoming video signal $VS_0$ is therefore input into the input port of Video Signal Sampling element 1110. The signal provided to the output port of Video Signal Sampling element 1110 is $G_0$, a stream of preferably digitized pixels or samples, that corresponds to the incoming video signal $VS_0$. $G_0$ is optionally accompanied by control pixels, and contains the image in digitized form. The choice of the protocol of control signals, if there are any, is best dictated by the format of the signal of the specific application. The output port of Video Signal Sampling element 1110 is connected to the input port of Band pass filter 1120.

Band pass filter 1120 comprises a broad band pass filter, that is preferably homogeneous. It may comprise a block of a spatial frequency analysis pyramid, such as a Burt or an FSD pyramid, optionally without the decimate step. Band pass filter 1120 produces an edge map $L_0$ of the input image $G_o$ at the output port of Band pass filter 1120. The edge map comprises edge samples whose level-values have edge features (Laplacians) that are similar to the negative of the second derivative of the edge functions, i.e. of the image brightness functions of the edges of the input image $G_o$. Each of these features contains a main zero crossing at approximately the center of the feature.

The output port of Band pass filter 1120 is connected to the input port of phase-preserving non-linear filter 1170, similar to the phase-preserving non-linear filter 500 of FIG. 5. The edge map $L_0$ is therefore processed by the non-linear filter 1170. An enhanced map $L_{-1}$ is thus produced at the output port of non-linear filter 1170. The enhanced map comprises enhancing samples whose value levels have enhancing functions for each edge of interest; the features are similar in shape and preserve the phase of the second derivative of an edge function. The enhanced functions also have zero crossings at pixels that further correspond to the edge pixels of the Laplacian map that contain or are substantially near the edge pixels with Laplacian main zero crossings. The output port of non-linear filter 1170 is connected to one of the input ports of adder element 1190.

The input video signal $VS_0$ is independently transmitted through delay element 1130. A delayed version of the incoming video signal $VS_0$ therefore appears at the output port of delay element 1130, which is connected to another of the input ports of adder element 1190.

The enhanced map $L_{-1}$ is thus added to the delayed incoming video signal $VS_0$ in phase by adder element 1190. Adder element 1190 can interpret control signals, if there are any. The result of the addition is an edge-enhanced image contained in $VS_{-1}$ appearing at the output port of adder element 1190 that is in digital format. The output port of adder element 1190 is connected to the input port of Video Signal Shaper 1180.

Video Signal Shaper 1180 converts the digital signal with the enhanced image into a signal that has the same format as the incoming video signal $VS_0$, and has level-values under the new format define analogous enhancing functions as have been imparted by the digital part of the invention. Optionally, Signal Shaper 1180 may comprise an element that, prior to the just described conversion, disassembles a two-dimensional image (possibly input in parallel) into a one-dimensional information component. The output port of Signal Shaper 1180 is connected to the input port of Video Display apparatus 1150. The high frequency content of the image of output video signal $VS_{-1}$ has been augmented with respect to the input, and therefore the image contained therein appears sharper on Video Display apparatus 1150, than the image contained in the incoming video signal $VS_0$ would appear. For this embodiment, the same optimizing considerations would apply as mentioned above.

The embodiments described above did not include an expansion stage. Possible applications will be described below which may include elements to expand the image.

Image enlargement with edge enhancement

Another method to practice the present invention is in conjunction with image enlargement or expansion. The relative blurring that occurs due to image expansion is rectified by the method and apparatus taught herein. A block diagram of a method to practice another version of the present invention is generally illustrated in FIG. 12.

The sequence of the steps described below is not the only sequence that will result in properly practicing the invention. According to a preferred mode, steps 1220, 1230, 1240, and 1250 are to be practiced in the order indicated in FIG. 12. Step 1210, however, can be performed before or simultaneously with any of the steps 1220, 1230, 1240, as long as step 1210 is performed before step 1250. The preferred mode of FIG. 12 will now be described.

Figure 12:
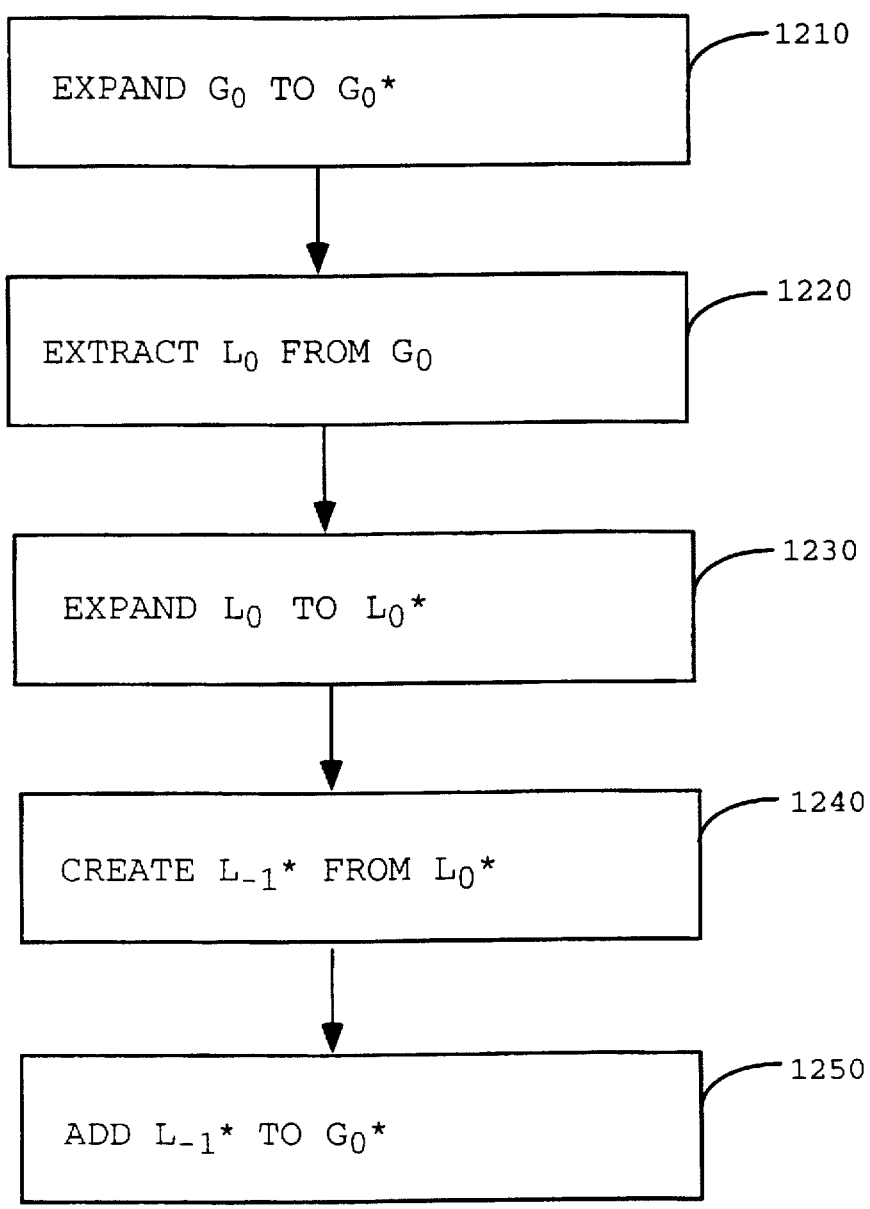
FIG. 12 illustrates a method of enlarging and enhancing images according to the present invention.

Referring to FIG. 12, as a first step 1210 of a preferred method of practicing the invention, an n-dimensional input image $G_o$ contained as information defined by level values of an input sample stream is expanded to $G_o{}^*$, which is another sample stream whose level values define information. A preferred mode of this expansion is by a linear factor of two for each dimension. The mode is preferred due to its simplicity of implementation. A visual image (that has two dimensions) would therefore be expanded by a linear factor of two in each dimension by inserting a sample at alternate samples and lines.

Prior to expansion of an image, it is usually necessary to determine the level value to be assigned to the new samples to preserve the image information in expanded form. A common technique used for making this determination is interpolation, that is level-values are assigned to the inserted pixels that are averages of neighboring original pixels. An alternate technique is to assign zero level values to all inserted pixels, low-pass filter the resulting image, and then multiply all level values by four (i.e. the linear expansion factor raised to a power of the number of dimensions), to restore the original image power. Such image expansion techniques preserve in the expanded image the features of the original image.

As a subsequent step 1220 of a method to practice the present invention, an edge map $L_o$ is extracted from input image $G_o$. The edge map $L_o$ comprises edge samples individually corresponding to the certain samples of the input sample stream. The edge samples contain Laplacian features, ensembles of edges that have level-values that define Laplacian functions. Each Laplacian function corresponds to each edge function of interest of input image $G_o$. Each Laplacian function contains a main zero crossing at approximately the center of the feature. Step 1220 can be performed by using an analysis step of a Burt pyramid or of a Filter-Subtract-Decimate pyramid (preferably without the "Decimate" step), or a band pass filter.

As a further step 1230, edge map $L_0$ is expanded to an expanded edge map $L_0{}^*$. This expansion should be by the same linear factor as chosen for step 1210, and can be optionally performed by the same techniques outlined in step 1210.

As a yet subsequent step 1240, an expanded enhanced map $L_{-1}{}^*$ is extracted from expanded edge map $L_0{}^*$. Step 1240 can be performed by multiplying all level-values of all edge samples of the expanded edge map $L_0{}^*$, with a constant, and "clipping" the resultant wave form by a preset clipping absolute level-value. According to this technique, positive input level-values higher that the positive of the clipping level-value are set equal to the positive of the clipping level-value. Further, negative input level-values smaller than the negative of the clipping level-value are set equal to the negative of the clipping level-value.

The expanded enhanced map $L_{-1}{}^*$ comprises expanded enhancing samples individually corresponding to the enhanced samples of enhanced map $L_{-1}$. Therefore, the expanded enhanced samples individually correspond to the expanded certain samples of the input sample stream. The expanded enhanced samples have level-values that define expanded enhanced functions for each edge of interest that are similar in shape and preserve the phase of the second derivative of an edge function of the input image, but scaled by the linear expansion factor. The expanded enhanced functions also have zero crossings at pixels that further correspond to the enhanced pixels of the enhanced map that contain zero crossings.

As a final step 1250, the expanded enhanced map $L_{-1}{}^*$ is added to the expanded input image $G_0{}^*$ in phase. The result of the addition is an expanded edge-enhanced image $G_{-1}{}^*$ in place of the original image $G_0$.

The same optimizing considerations apply as were mentioned above.

Preferred Apparatus for Enlargement with Edge Enhancement.

Another preferred embodiment of the present invention is illustrated in FIG. 13, and will now be described.

The n-dimensional input image $G_o$ is applied to the input port of expanding element 1310. The image $G_o$ is contained as information defined by level values of an input sample stream. Expanding element 1310 expands the input image $G_o$ to expanded input image $G_o{}^*$. The newly inserted pixels are initially given a zero level value. The expanding element 1310 then low-pass filters the resulting expanded image, and then multiplies its level values by the linear expansion factor raised to a power of the number of dimensions, to restore the original image power. A preferred mode of this expansion is by a linear factor of two for each dimension, with a final multiplication by four, to restore the original image power. The output port of expanding element 1310 is connected to the input port of delay element 1315.

The expanded input image $G_0{}^*$ is thus transmitted through delay element 1315. A delayed version of expanded input image $G_0{}^*$ therefore appears at the output port of delay element 1315, which is connected to a input port of adder element 1350.

The input $G_0$ is also applied to band pass filter 1320, which is preferably a homogeneous filter, and may comprise an analysis stage of a spatial frequency analysis pyramid, such as a Burt or an FSD pyramid, optionally excluding the decimate step. In a preferred embodiment, homogeneous filter 1320 includes a convolution filter 1322, a delay element 1324 and a subtraction element 1326. The convolution filter 1322 convolves the input image at every sample location by a symmetric kernel that optimally has a low pass filter (LPF) characteristic. Convolution filter 1322 therefore outputs an LPF version of $G_0$. The output port of the convolution filter 1322 is connected to the subtrahend terminal of subtraction element 1326.

Delay means 1324 delays the input signal $G_0$ by the same amount of time as is expended by the convolution filter 1322. The output port of the delay means 1324 is connected to the minuend terminal of subtraction element 1326.

The output of the convolution filter 1322 is thus subtracted from the output of the delay means 1324 in phase by subtraction element 1326. The LPF version of $G_0$ is thus subtracted from $G_0$, to produce an edge map $L_0$ of the input image $G_o$ at the output port of subtraction element 1326. The edge map $L_0$ is an information component comprising edge pixels or samples whose level-values define edge features (Laplacians) that are similar to the negative of the second derivative of the edge functions of the input image $G_o$, i.e. of the image brightness functions of the edges of the input image $G_o$. Each edge feature has a main zero crossing approximately at its center. The output port of subtraction element 1326 is connected to the input port of expanding element 1330.

The edge map $L_0$ is thus applied as an input to the expanding element 1330, which expands the edge map $L_0$ to the expanded edge map $L_0$. The expansion is preferably implemented in the same way as implemented by expanding element 1315, and should be performed for the same linear expansion factor in each dimension as is performed by expanding element 1315. The output port of expanding element 1330 is connected to the input port of phase-preserving non-linear filter 1340.

The expanded edge map $L_0^*$ is thus subsequently processed by the phase-preserving non-linear filter 1340. An enhanced expanded map $L_{-1}$ is thus produced at the output port of non-linear filter 1340. The enhanced expanded map $L_{-1}^*$ is an information component comprising enhancing samples whose level values have enhanced functions for each edge of the input image $G_o$ that are similar in shape and preserve the phase of the second derivative of the edge function of the input image $G_o$ they correspond to. The enhanced functions also have zero crossings at pixels that further correspond to the edge pixels of the Laplacian map that contain or are substantially near the edge pixels with Laplacian main zero crossings.

The output port of non-linear filter 1340 is connected to another of the input ports of adder element 1350. The expanded enhancing map $L_{-1}^*$ is thus added to the expanded input image $G_0^*$ in phase. The result of the addition is a final image $G_{-1}^*$ appearing at the output port of adder element 1350. The final image $G_{-1}^*$ is an information component comprising samples having level-values defining the final image $G_{-1}^*$. The final image $G_{-1}^*$ has been expanded and delayed in real time with respect to the input image $G_0$, by the amount of delay 1315 plus the delay imparted by the adder element 1350.

Again, the optimizing considerations discussed above apply.

Exemplary applications

There are many equivalent methods and apparatus for practicing the present invention in addition to these set forth above. The above preferred embodiments are instructive in implementing the present invention in all the applications listed below. In all these applications the amount of edge enhancement may be controllable at the receiving end, as tunable values of the non-linear filter. As earlier described, the apparatus of FIG. 11 and 13 can be combined, e.g. by interpolating two expanders in FIG. 11, one between delay 1130 and adder 1190, and the other between Band pass filter 1120 and phase preserving non-linear filter 1170.

Restoration of old motion pictures.

According to a method of this invention, old motion pictures can be restored. This is accomplished by projecting the motion picture and viewing the projection with a video camera, sampling the video image to convert to digital and then expanding and enhancing the image. The expanded and enhanced images can be stored on film (by projecting and refilming) or in an enhanced video tape format, or in a compressed digital format.

Videophone

A video phone is a telephone apparatus that can also receive, transmit, and display a visual image, usually that of the persons using the telephone apparatus. The visual images are transmitted through the telephone line. The telephone line that was originally designed for voice signals has only enough bandwidth for acoustic communication. Visual images, however, require substantially more bandwidth, which in turn practically limits the detail that can be provided in a videophone. This in turn practically limits the size of the screen of a videophone. According to the present invention, an expanded videophone screen is provided, that outputs an expanded and edge-enhanced version of the input image.

Advanced definition televisions

An advanced definition television is implemented utilizing existing broadcast signals. An advanced definition TV receiving set is implemented by having a screen with more digital positions per row and/or per column than an ordinary TV. This advanced definition TV may receive as input an ordinary TV broadcast, expand to the larger number of pixels, while also sharpening the image.

The incoming TV signal $TVS_0$ has a predetermined format that is well-known in the art. Specifically, the incoming TV signal $TVS_0$ comprises a predetermined mixture of control samples and information signal that arrive in periodic sets. Each such periodic set is called a frame, and corresponds to one complete scan of the screen of an ordinary TV set. The signal $TVS_0$ is analog in every horizontal scan line. Therefore, an Analog to Digital converter would be properly applied to digitize the image.

If the signal is for color TV, it is advantageous to enhance the intensity content of the luminance channel. The edges that will be enhanced, therefore are the "black and white" edges.

A Signal Sampling element for TV such as Signal Sampling element 1110 of FIG. 11 converts the incoming TV signal $TVS_0$ into samples or pixels usable by the present invention. Optionally, the TV Signal Sampling element 1110 might further comprise an element that assembles a frame into a two-dimensional picture, to facilitate further processing. Subsequently, the expansion and enhancement described in FIG. 13 would be applied. Finally, a Video Signal Shaper might be used, similar to the Video Signal shaper 1180 of FIG. 11. However, it might not be necessary, depending on how the advanced screen TV accepts signal input.

Zooming Applications

Zooming is employed when only a portion of a static image is of interest. Typically zooming is accomplished by identifying a portion of a static image, optionally discarding all other portions of the image, and enlarging only the selected portion of the image. As previously detailed, the inherent sharpness of an image is decreased when an image is expanded or enlarged. Therefore, a problem with conventional zooming techniques is that the enlarged portion of the image appears blurred.

Zooming is performed in accordance with the invention by enlarging and enhancing only a portion of the image. In this manner, the original inherent sharpness of the image is restored, while fidelity to its edges is maintained.

Again, the optimizing considerations discussed above apply.

Conclusion

The invention has been described in connection with preferred embodiments. Numerous alternatives, modifications, variations and uses will be apparent to those skilled in the art in light of the foregoing description.

What is claimed is:

1. A computer implemented image enhancement method comprising the steps of:

receiving an input image $G_0$ having spatial frequencies up to an initial maximum spatial frequency;

generating, in a computer, an edge map $L_0$ from the input image $G_0$ by applying a high frequency band pass filter;

generating, in the computer, an enhanced map $L_{-1}$ from the edge map $L_0$, by applying an operator which preserves phase characteristics of the edge map and which generates spatial frequencies exceeding the initial maximum spatial frequency, thereby expanding the spatial frequencies beyond an initial spatial frequency range existing in the input image $G_0$, said operator being a non-linear operator multiplied by a preselected positive constant; and applying the enhanced map $L_{-1}$ to the input image $G_0$ to generate an enhanced image $G_{-1}$.

2. The image enhancement method of claim 1, wherein the preselected positive constant is selected to generate spatial frequencies at least a factor of two greater than the initial maximum spatial frequencies.

3. The image enhancement method of claim 2, wherein the non-linear operator is
- a preselected second constant T, for values of the edge map $L_0$ greater than second constant T;
- a negative of second constant T, for values of the edge map $L_0$ less than the negative of the second constant T; and
- the value of the edge map $L_0$, for values of the edge map $L_0$ greater than the negative of second constant T and less than the positive of the second constant T.

4. The image enhancement method of claim 2, wherein the non-linear operator is defined by a bounding function BOUND ($L_0$)
wherein $$BOUND(S) = \begin{vmatrix} T \text{ if } S > T \\ S \text{ if } -T \leq S \leq T \\ -T \text{ if } S < -T \end{vmatrix}$$

and wherein S is a value of a portion of $L_0$ and T is a second preselected constant.

5. An image enhancement apparatus, comprising:
means for receiving an input image $G_0$ having spatial frequencies up to an initial maximum spatial frequency;
means for generating an edge map $L_0$ from the input image $G_0$ by applying a high frequency band pass filter;

means generating an enhanced map $L_{-1}$ from the edge map $L_0$, by applying an operator which preserves phase characteristics of the edge map $L_0$ and which generates spatial frequencies exceeding the initial maximum spatial frequency, thereby expanding the spatial frequencies beyond an initial spatial frequency range existing in the input image $G_0$, said operator being a non-linear operator multiplied by a preselected positive constant; and means for applying the enhanced map $L_{-1}$ to the input image $G_0$ to generate an enhanced image $G_{-1}$.

6. The image enhancement apparatus of claim 5, wherein the preselected positive constant is selected to generate spatial frequencies at least a factor of two greater than the initial maximum spatial frequencies.

7. The image enhancement apparatus of claim 6, wherein the non-linear operator is
- a second preselected constant T, for values of the edge map $L_0$ greater than the preselected constant T;
- a negative of second constant T, for values of the edge map $L_0$ less than the negative of the second constant T; and
- a value of the edge map $L_0$, for values of the edge map $L_0$ greater than the negative of the second constant T and less than the positive of the second constant T.

8. The image enhancement apparatus of claim 6, wherein the non-linear operator is defined by a bounding function BOUND ($L_0$)
wherein $$BOUND(S) = \begin{vmatrix} T \text{ if } S > T \\ S \text{ if } -T \leq S \leq T \\ -T \text{ if } S < -T \end{vmatrix}$$

and wherein S is a value of a portion of $L_0$ and T is a second preselected constant.

* * * * *